United States Patent [19]
Reckwerdt et al.

[11] Patent Number: 5,379,642
[45] Date of Patent: Jan. 10, 1995

[54] METHOD AND APPARATUS FOR PERFORMING IMAGING

[75] Inventors: Wilbur A. Reckwerdt, Campbell; Sved O. Ishrak, Los Gatos; Wanqun Bao, Santa Clara, all of Calif.

[73] Assignee: Diasonics Ultrasound, Inc., Milpitas, Calif.

[21] Appl. No.: 93,808

[22] Filed: Jul. 19, 1993

[51] Int. Cl.⁶ .................................................. G01N 29/00
[52] U.S. Cl. .................................... 73/625; 128/661.01
[58] Field of Search ........................ 128/660.06, 660.07, 128/660.08, 661.01; 73/625, 626, 597

[56] References Cited

U.S. PATENT DOCUMENTS

| | | |
|---|---|---|
| Re. 31,362 | 8/1983 | Shenk . |
| 3,898,840 | 8/1975 | McElroy . |
| 4,117,446 | 9/1978 | Alais . |
| 4,137,777 | 2/1979 | Haverl et al. . |
| 4,154,113 | 5/1979 | Engeler . |
| 4,207,772 | 6/1980 | Stoller . |
| 4,208,016 | 6/1980 | Thomenius et al. . |
| 4,218,768 | 8/1980 | Hassler . |
| 4,235,111 | 11/1980 | Hassler . |
| 4,258,574 | 3/1981 | Hidebrand et al. . |
| 4,275,597 | 6/1981 | Quedens et al. . |
| 4,305,296 | 12/1981 | Green et al. . |
| 4,307,613 | 12/1981 | Fox . |
| 4,328,707 | 5/1982 | Clement et al. . |
| 4,383,447 | 5/1983 | Kretz . |
| 4,387,597 | 6/1983 | Brandestini . |
| 4,395,912 | 8/1983 | Hassler . |
| 4,395,912 | 8/1983 | Hassler . |
| 4,398,539 | 8/1983 | Proudian . |
| 4,409,982 | 10/1983 | Plesset et al. . |
| 4,442,713 | 4/1984 | Wilson et al. . |
| 4,516,583 | 5/1985 | Richard . |
| 4,532,933 | 8/1985 | Hokanson . |
| 4,534,221 | 8/1985 | Fife et al. . |
| 4,582,065 | 4/1986 | Adams . |
| 4,608,868 | 9/1986 | Green . |
| 4,629,927 | 12/1986 | Samodovitz . |
| 4,665,924 | 5/1987 | Saito et al. . |
| 4,677,981 | 7/1987 | Coursant . |
| 4,691,570 | 9/1987 | Hassler .......................... 128/661.01 |
| 4,730,495 | 3/1988 | Green . |
| 4,784,147 | 11/1988 | Moshfeghi . |
| 4,823,773 | 4/1989 | Naser et al. . |
| 4,852,577 | 8/1989 | Smith et al. . |
| 4,862,892 | 9/1989 | Green . |
| 4,865,042 | 9/1989 | Umemura et al. . |
| 4,870,971 | 10/1989 | Russell et al. . |
| 4,974,211 | 11/1990 | Corl . |
| 5,024,094 | 6/1991 | Kubota et al. . |
| 5,033,456 | 7/1991 | Pell et al. . |
| 5,052,394 | 10/1991 | Carpenter et al. ............. 128/660.06 |
| 5,060,652 | 10/1991 | Umemura et al. . |
| 5,065,763 | 11/1991 | Green et al. . |
| 5,113,866 | 5/1992 | Hassler et al. ................. 128/660.06 |

*Primary Examiner*—George Manuel
*Attorney, Agent, or Firm*—Blakely, Sokoloff, Taylor & Zafman

[57] ABSTRACT

An ultrasound imaging system for performing dynamic focusing of ultrasonic waves during transmit and receive. The present invention includes a method and a means for transmitting ultrasonic waves to a multiple depths within a body. The present invention optimizes the transmit frequency for each of the multiple depths to localize the energy of the ultrasonic waves. The present invention also includes a method and means for performing dynamic receive focusing of the reflected ultrasonic waves produced by discontinuities in the body, such that it is focused to receive ultrasonic waves from the depth at which the transmitted ultrasonic waves are focused.

42 Claims, 9 Drawing Sheets

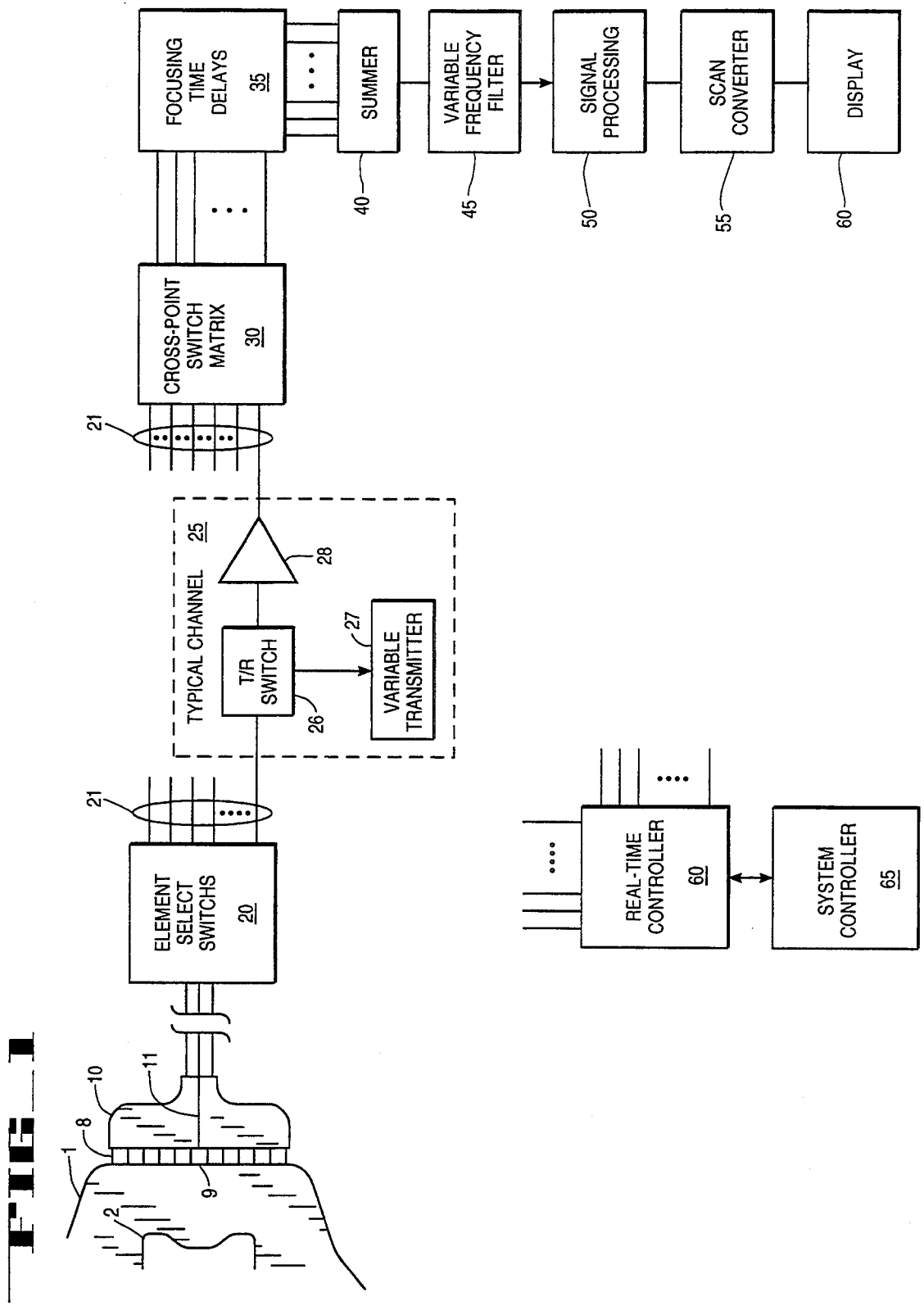

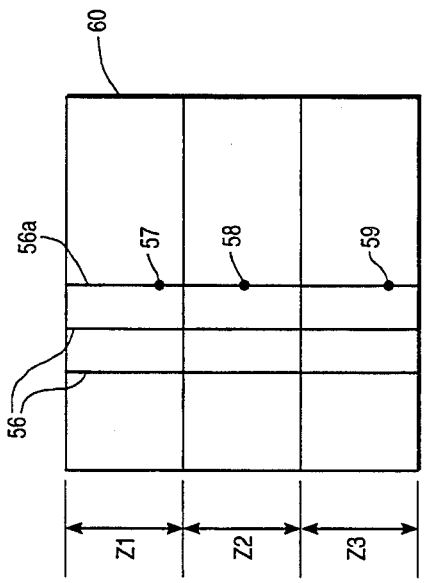
FIG._2A
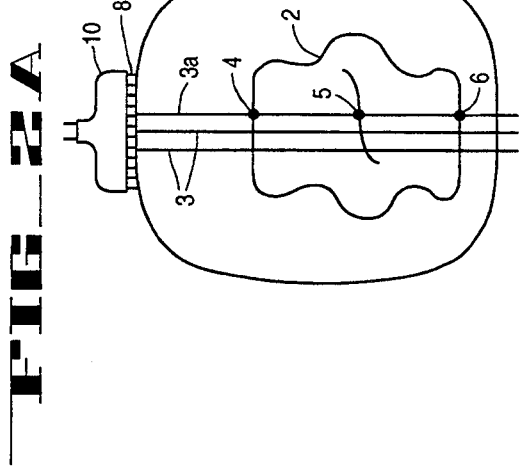
FIG._2B
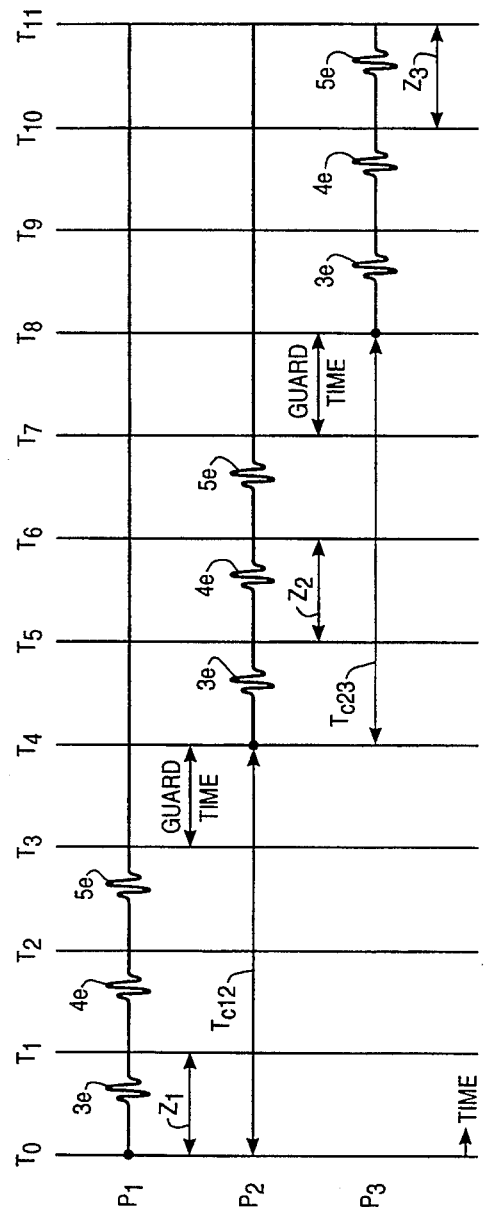
FIG._2C

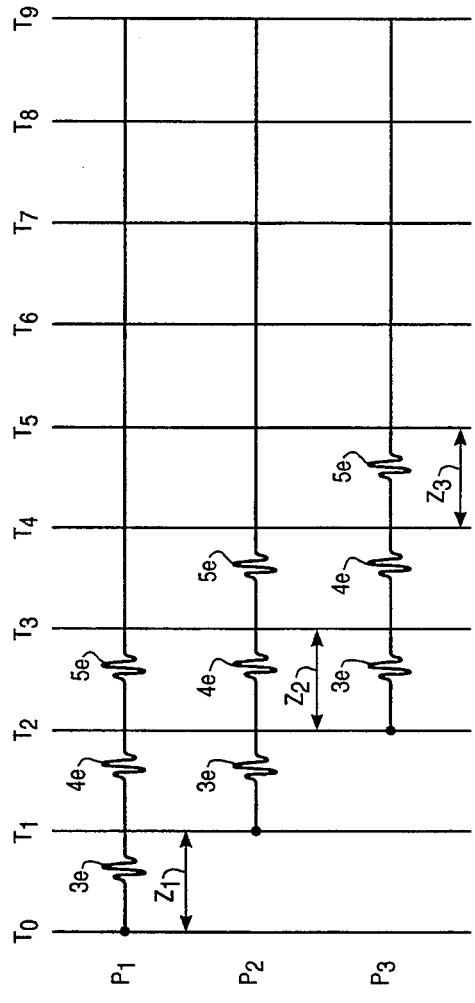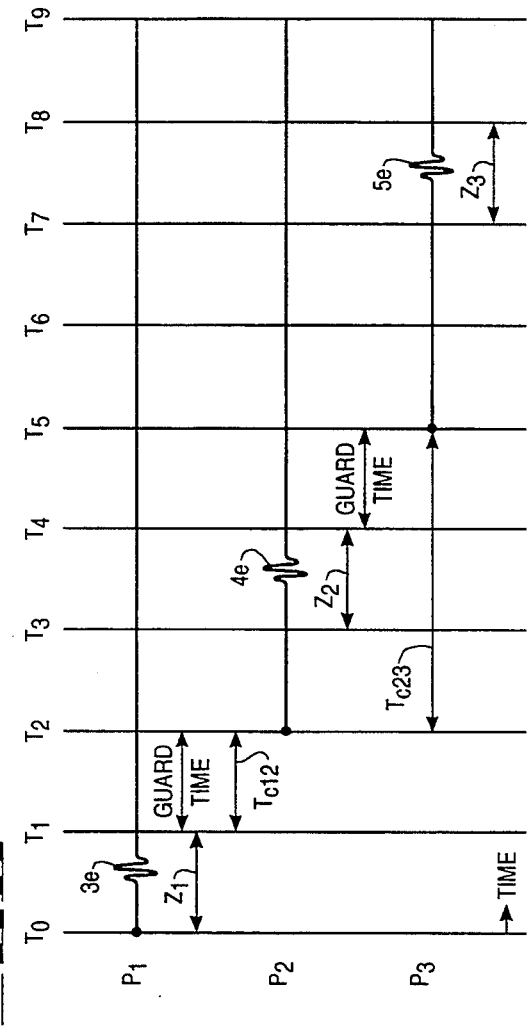

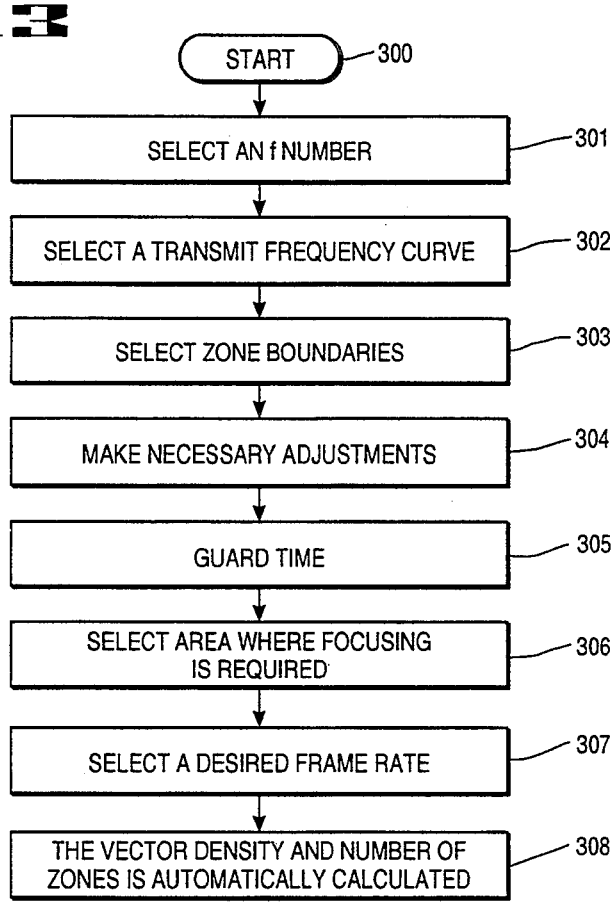
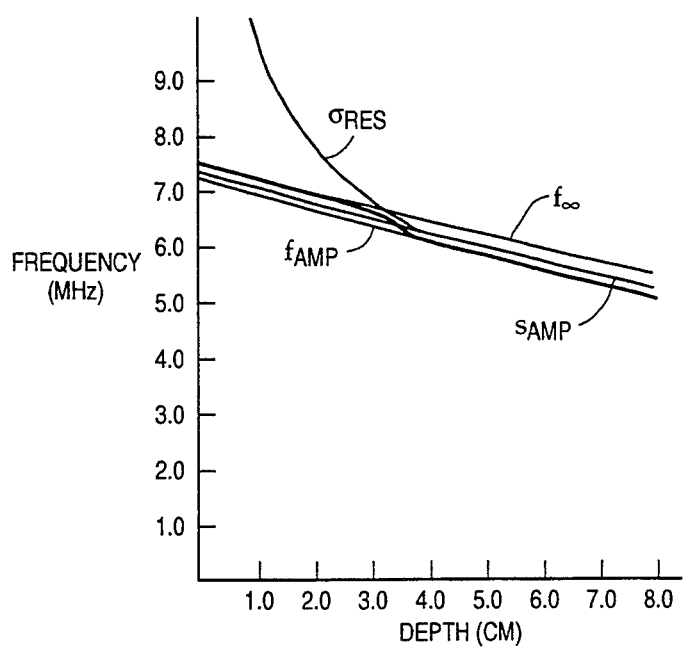
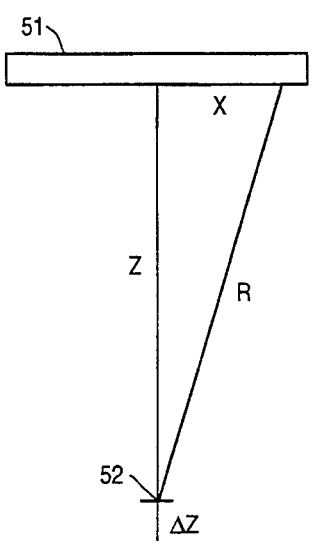

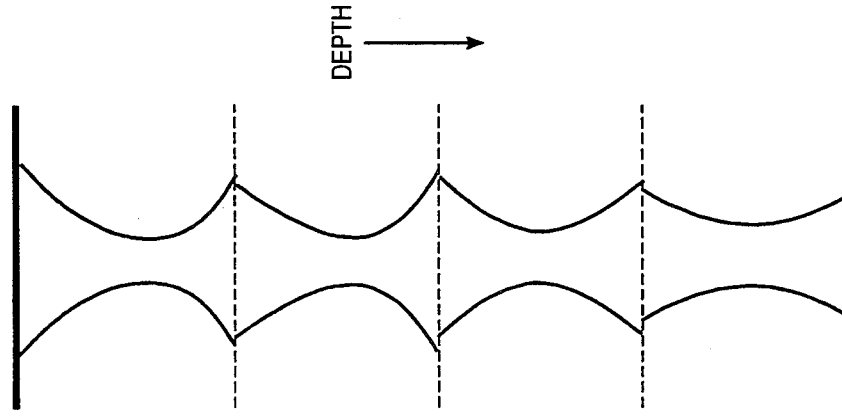
FIG_6A CONVENTIONAL
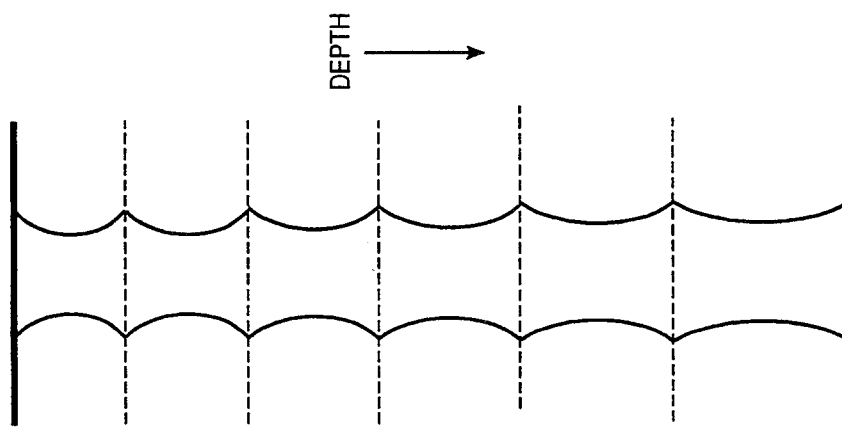
FIG_6B CONFOCAL F/3
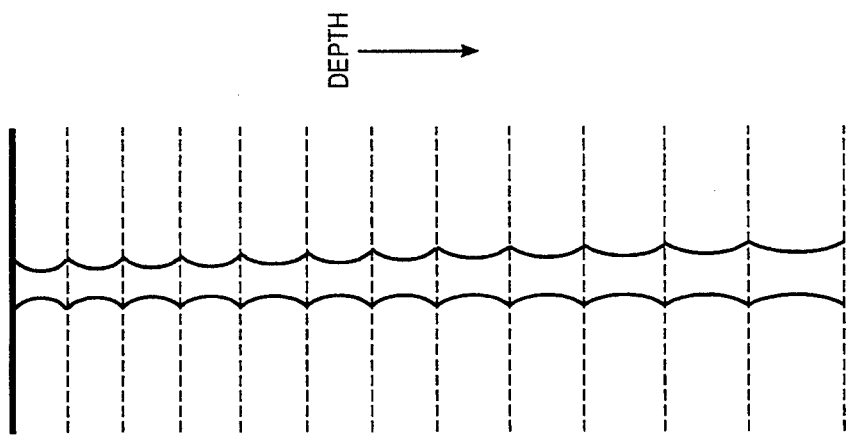
FIG_6C CONFOCAL F/1.5

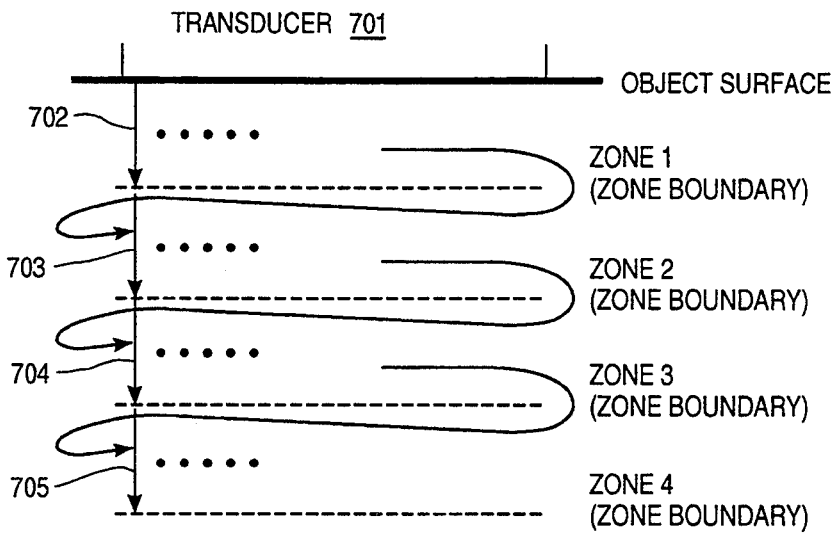
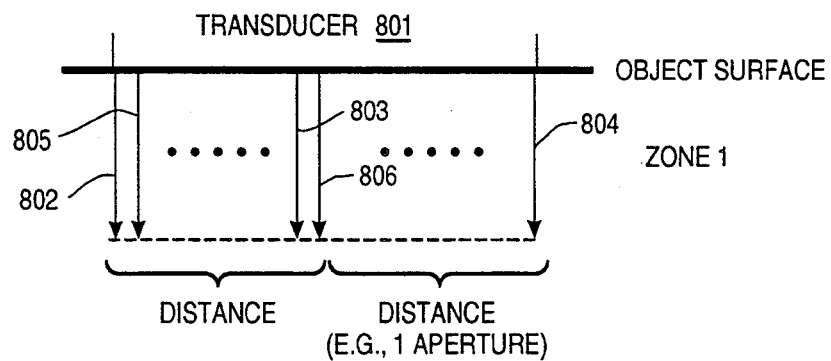
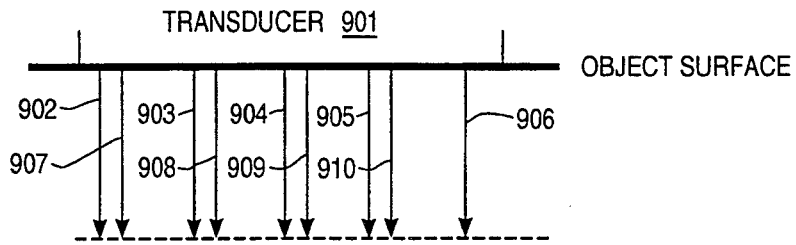

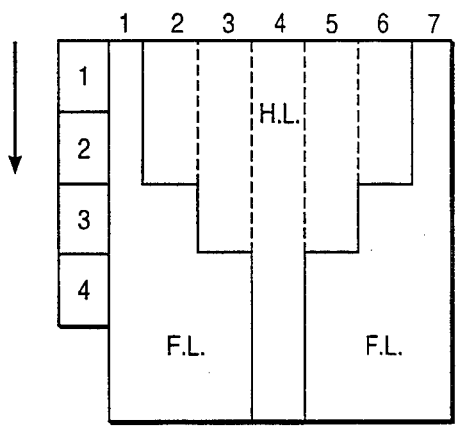
FIG_10
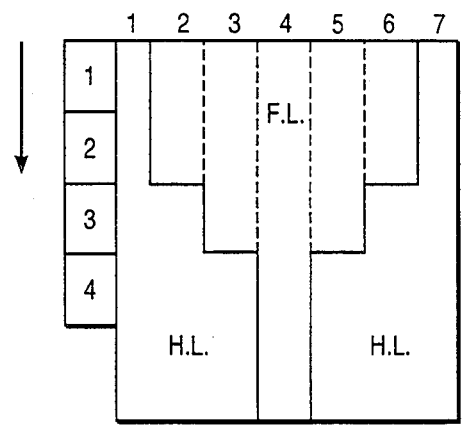
FIG_11
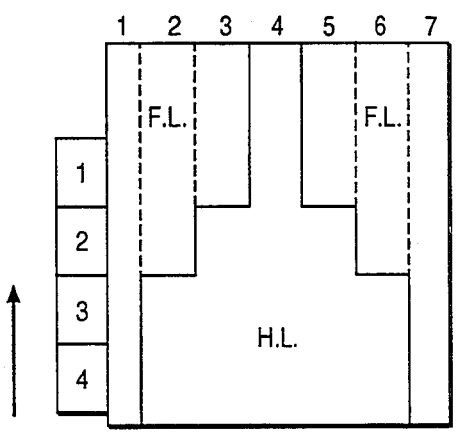
FIG_12
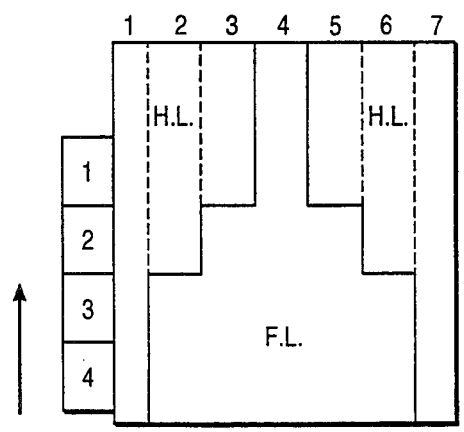
FIG_13

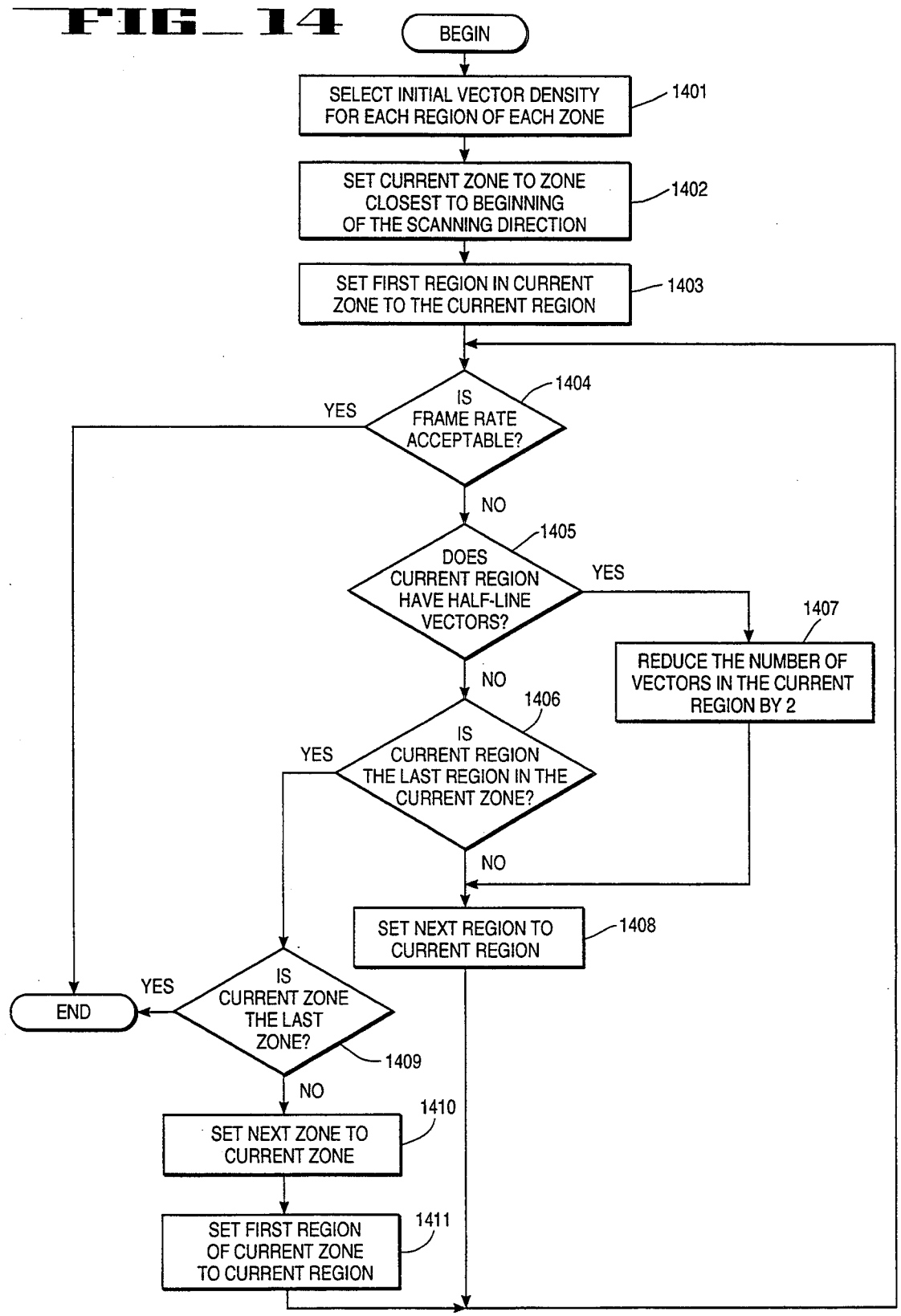

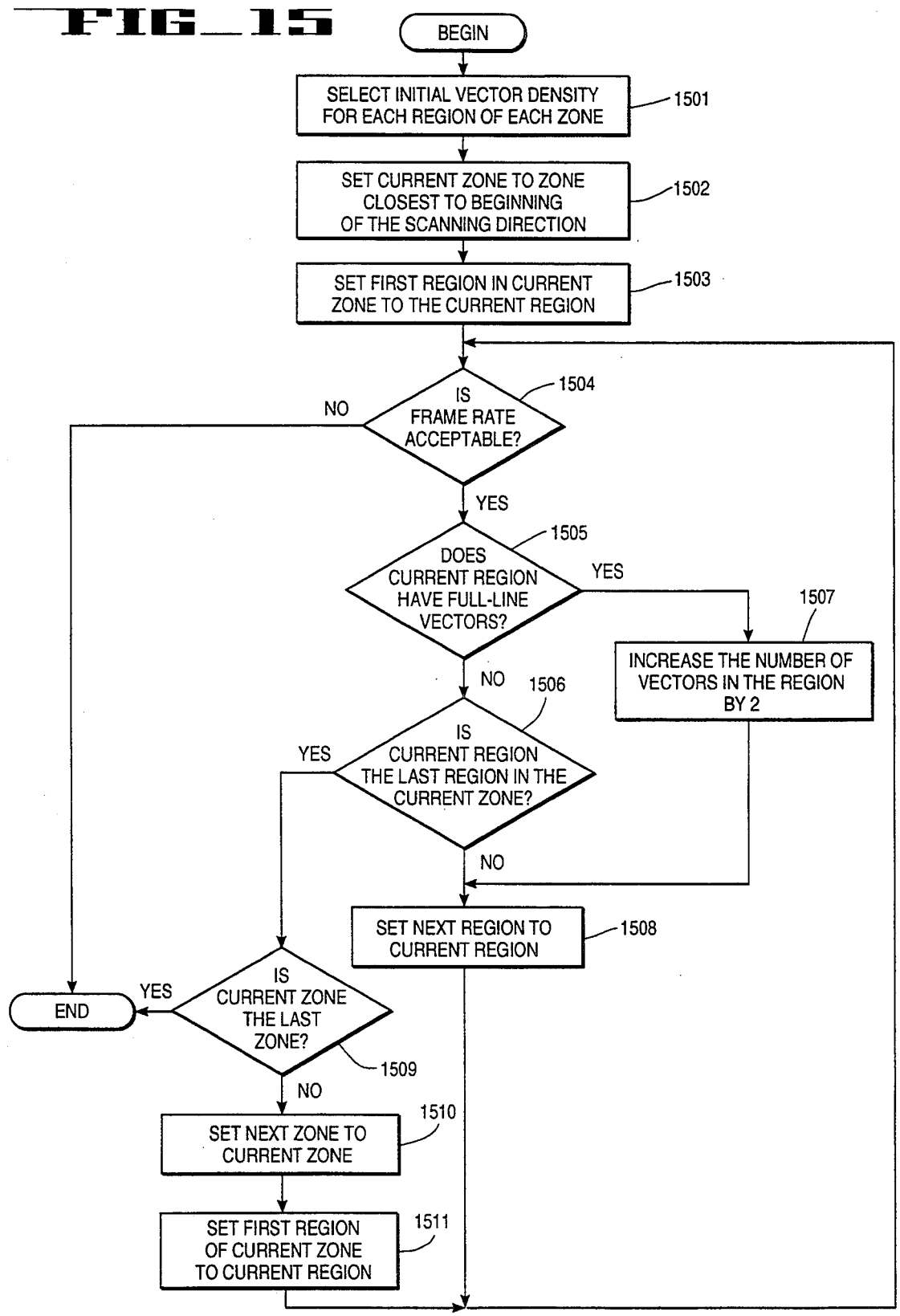

METHOD AND APPARATUS FOR PERFORMING IMAGING

FIELD OF THE INVENTION

The present invention relates to the field of ultrasonic imaging; in particular, the present invention relates to an apparatus and method for scanning an object during transmission of ultrasonic imaging.

BACKGROUND OF THE INVENTION

Pulse-echo ultrasonic imaging technology has become a vital tool for clinicians for examining the internal structure of living organisms. In the diagnosis of various medical conditions, it is often useful to examine soft tissues within the body to show structural details of organs and blood flow in these organs. Experienced clinicians can use this information in diagnosing various pathologies.

To examine internal body structures, ultrasonic images are formed by producing very short pulses of ultrasound using a transducer, sending the pulses through the body, and measuring the properties of the echoes (e.g., amplitude and phase) from targets at varying depths within the body. Typically, the ultrasound beam is focused at various depths within the body in order to improve resolution or image quality. The echoes are received by a transducer, typically the same transducer used for transmission, and processed to generate an image of the object, usually referred to as a B-scan image.

Generally, the transmitted ultrasound beam is focused from pulse to pulse. It is common to create an image focused at a specific and operator selectable depth by focusing the ultrasound beam at that depth for all pulses. This is called single zone focusing. An extension of single zone focusing uses multiple sets of focused transmitted beams to create a composite image. Each set is focused at a specific depth. This is usually called multiple zone focusing. Generally, the number of zones varies from three to five zones. In this manner, real-time images are obtained with improved focus in certain regions in the image. This increase in image quality usually results in lower frame rates. Lower frame rates mean that moving structures or blood flow are not easily imaged and diagnosis may be impaired.

An ultrasound image is constructed by acquiring data along specific vectors or lines. In other words, a transmit pulse is sent from the transducer in a given direction and echos from scatters in that direction are received by the transducer. This process is commonly referred to as scanning the image. In multi-zone focusing, the data is acquired along each line using multiple transmit pulses, where a transmit pulse is sent along the line for each zone. After all of pulses for a particular line have been transmitted, then scanning continues at another line.

The scanning of an object normally occurs from one side of the transducer to the other. In this manner, adjacent vectors are fixed in order beginning at one side of the transducer and finishing at the other side. Because each line is comprised of multiple zones, each having its own transmit pulses, the transmission of the transmit pulses for the single line must be controlled to ensure that the reception of the echos from each of the pulses do not interfere with each other. This interference is referred to as axial interference. Axial interference corrupts the image.

One prior art solution for reducing axial interference is to include a guard band (i.e., a time period) between successively fired transmit pulses on the same line to allow the echos from previous transmit pulses to dissipate sufficiently before sending a subsequent transmit pulse. In this manner, the echos from the preceding pulse on the same line do not cause enough interference to degrade the image, thereby resulting in a higher quality image. It is desirable to reduce the axial interference due to the transmit vectors on the same line.

Another problem that may occur in scanning an image is the interference caused by adjacent vectors. This interference is referred to as lateral interference and is caused by the transmit pulse partially overlapping each other due to the expansion of the ultrasound signal within the object. The lateral interference causes the lateral resolution to be corrupted. It is desirable to reduce lateral interferences produced by adjacent transmit vectors.

Also during scanning of an object, signal ring-down may occur in which an ultrasound wave is distorted for an extended period of time due to layers of the object having different attenuations. The distortion can interfere with any ultrasound waves fired nearby. Signal ring-down occurs most often when imaging a fluid region, such as bladders and obstetrics, where the fluid region has such a different refractory index that the ultrasound wave becomes distorted. Therefore, it is also desirable to reduce signal ring-down when performing ultrasound imaging.

The present invention provide for altering the spacing between adjacent vectors, the timing of each vector, and the number of vectors needed to make an ultrasound image. In this manner, the present invention reduces axial interference, lateral interference and signal ring-down.

SUMMARY OF THE INVENTION

A method and apparatus for imaging an object is described. The present invention includes a method and apparatus for selecting multiple focal depths within an object so that the object is imaged using multiple zones. Also included is a method and apparatus for sending energy waves to each of the zones. The energy waves are focused and transmitted to the zones where the waves are reflected from discontinuities within the object to produce a plurality of echo signals. The energy waves are transmitted to each of the zones, such that one of the zones corresponding to one of the focal depths is scanned completely before focusing and transmitting to another of the focal depths. The present invention includes means for receiving the echo signals and generating an image of the object in response to the echo signals.

The present invention also includes a method and apparatus for scanning an object using energy waves. The scanning method and apparatus of the present invention divides the face of a transducer into a predetermined number of lateral segments and selects multiple focal depths within the object to image the object with multiple zones. Each of the lateral segments transmits energy waves to a distinct region of each of the zones. The present invention also includes a method and apparatus for sending energy waves to each of the plurality of zones such that the energy waves are focused at each of the focal depths. The waves are reflected from discontinuities within the object to produce a plurality of echo signals. The present invention also includes a method and apparatus for varying the vector density per region and per zone when scanning the image.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 1 is a block diagram of the linear array ultrasound imaging system of the present invention.

FIGS. 2A, 2B, 2C, 2D and 2E illustrate an object imaged by both the prior art ultrasound system and the ultrasound imaging system of the present invention and their corresponding temporal sequences for ultrasonic pulse transmission.

FIG. 3 illustrates the currently preferred embodiment of the confocal focusing method of the present invention.

FIG. 4 illustrates an example of a transmit frequency curve resulting from the currently preferred embodiment.

FIG. 5 illustrates the spatial relationship between the transducer beam front and focal point.

FIGS. 6A, 6B, and 6C illustrate a comparison between the beam patterns produced by the present invention and traditional multi-zone focusing.

FIG. 7 illustrates the scanning pattern of the present invention.

FIG. 8 illustrates the scanning pattern for a zone in the present invention.

FIG. 9 illustrates a scanning pattern for scanning an object having fluid according to the present invention.

FIGS. 10–13 illustrate examples of scan patterns where the vector density has been varied per depth and per region of the transducer according to the present invention.

FIG. 14 illustrates one embodiment of a process for varying the vector density while maintaining a desired frame rate.

FIG. 15 illustrates one embodiment of a process for varying the vector density while maintaining a desired frame rate.

DETAILED DESCRIPTION OF THE INVENTION

An ultrasonic imaging apparatus and method for examining the internal structure of an object is described. In the following description, numerous specific details are set forth such as specific ultrasonic wave propagation characteristics, etc., in order to provide a thorough understanding of the present invention. It will be obvious, however, to one skilled in the art that the present invention may be practiced without these specific details. In other instances, well-known ultrasonic wave propagation characteristics and ultrasound processing operations have not been described in detail to avoid unnecessarily obscuring the present invention.

The following terms are utilized in the description below:

Field of View: The field of view determines the depth at which we focus the confocal transmit vectors. This affects the timing of each vector and subsequently the overall frame rate.

Vector Density: The number of vectors fired at each transmit focal depth determines the overall vector density. The number of vectors fired multiplied by the timing of each vector defines the overall frame rate.

Lateral Resolution: The spacing between adjacent vectors defines the lateral resolution. If the spacing is of the same order or larger than the lateral beam width then this spacing limits the horizontal resolution.

Axial Resolution: Focusing the ultrasound waves based on the depth of focus defines the axial resolution. The number of ultrasound waves needed to achieve a desired tightness of the focus over depth determines the spatial resolution. The depth of focus and the desired tightness of focus determine the timing of each vector.

Pixel Fill-In: The space between adjacent vectors is normally filled by an interpolator; the vector density determines the number of pixels that must be filled by the interpolator to avoid black holes in the image.

Stair-Step: Using a sector probe, the vectors are transmitted along radial directions; therefore, the spacing between vectors in rectilinear coordinates increases with depth. Using a one-dimensional-horizontal interpolator, a bright arc in the image will be represented as a stair step. The lateral resolution will define the extent of the stair step.

Lateral Interference: The lateral beam width determines the amount of interference between adjacent vectors. This interference artifact corrupts the image.

Axial Interference: Each ultrasound wave focused over depth can interfere with the next wave focused over a deeper depth. This interference artifact corrupts the axial resolution.

Signal Ring-Down: Each ultrasound wave moves through the multiple layers of media interference. If the layers are significantly different in attenuation, they can create a distortion for a prolonged time period. Any waves that are fired in the direction of this distortion field will produce an interference artifact.

Half-Line/Full-Line Scanning: Full line scanning is defined as firing one vector for each of the transducer elements. Half-line scanning fires two vectors for each of the transducer elements.

Overview of the Present Invention

The present invention provides a method and apparatus for transmitting ultrasonic pulses into an object under observation such that the spacing, timing and number of vectors are controlled. Using this control, axial and lateral interference and signal ring-down are reduced. The ultrasound image of the present invention is made by firing multiple waves focused at varying depths from the transducer face to the bottom of the field of view. In the present invention, all of the vectors for one focal depth, or zone, are fired before focusing at the next depth. The order in which the different depths are handled is also independent of each other. In other words, the various depths of focus may be scanned in any order. Also in the present invention, the individual vectors used in scanning and zone are spaced apart to reduce lateral interference. In one embodiment, these vectors are spaced one aperture apart.

The present invention also provides a method and apparatus for firing vectors non-sequentially. In one embodiment, the present invention fires vectors, such that the vectors away from distortion fields can be fired while other distortion(s) decontaminates. The number of vectors to fire non-sequentially varies according to the application and the number of zones being imaged.

The present invention includes a method and apparatus for reducing the number of lines fired for each depth. Instead of using half-line scanning or full-line scanning to produce ultrasound images as in the prior art, the present invention allows variable vector density per depth and per region of the transducer array. The transducer is divided into a predetermined number of lateral segments and the depth is defined by the desired spatial resolution. In one embodiment, an algorithm is used to determine the vector density that may be used to maintain a desired frame rate while obtaining the desired resolution.

Overview of the Ultrasonic Imaging System

FIG. 1 depicts a block diagram of the ultrasonic imaging system of the present invention. Referring to FIG. 1, the ultrasonic imaging system includes an ultrasonic probe 10, comprised of a linear array 8 of typical transducer elements 9 for transmitting ultrasonic pulses to and receiving ultrasonic pulses from an object 1. Ultrasonic probe 10 is coupled to element select switches 20 by cable 15, such that electrical conductor 11 is coupled to element select switches 20. Element select switches 20 is coupled to cross point switch matrix 30 by multiple channels 21. A typical channel 25 is shown. Referring to typical channel 25, one of the outputs of switches 20 is coupled to transmit/receive (T/R) switch 26. T/R switch 26 is coupled to variable frequency transmitter 27 and the input of receive amplifier 28. The output of amplifier 28 is coupled to one of the inputs to matrix 30. Cross point switch matrix 30 is also coupled to focusing time delays 35. Focusing time delays 35 are also coupled to summer 40.

Summer 40 is coupled to variable frequency filter 45. Variable frequency filter 45 is coupled to signal processing module 50, which in turn is coupled to scan converter 55. Scan converter 55 is coupled to display 60. A real time controller 60 is coupled to and in control of all aspects of the imaging system within a single frame of the image. Other aspects of the system are coupled to and under system control 65.

Typical transducer element 9 is coupled to element select switches 20 of the ultrasonic imaging system by electrical conductor 11 which is part of cable 15. Cable 15 is typically a coaxially shielded wire. Element select switches 20 may be used to selectively turn on or off transducer elements in army 8. When selected, element 9 is coupled to transmit/receive switch 26, via element select switches 20, which permits high voltage variable transmitter 27 to send a very short voltage pulse or pulses to element 9 under the timing control of real time controller 60. In this manner, ultrasonic pulses are introduced into object 1 by element 9 and other selected elements of array 8.

Controller 60 regulates the respective transmitting times of elements in array 8 with respect to each other in such a way as to create a focus at a selected depth in object 1.

Echoes from target 2, within object 1, are reflected back to array 8, and in particular element 9 of array 8, and represent information about object 1 which is desired in the image. Transducer element 9 and other selected elements of array 8 then convert the ultrasonic echoes into electrical signals which are passed through element select switches 20 and transmit/receive switch 26, which real time controller 60 has now connected to receiver amplifier 28.

Amplifier 28 passes the echo signals through cross-point switch matrix 30 which is also under control of real time controller 60. Amplifier 28 amplifies the very small signals from element 9 to voltage levels greater than the noise levels of cross-point switch matrix 30. Switch matrix 30 allows signals from element 9 to pass through to focusing delay circuits 35 and allows various combinations of elements of army 8 to be connected together with appropriate time delays with respect to other groups of elements of array 8 for receive focusing. Summer 40 then adds signals from focusing time delay module 35 to produce a single ultrasonic signal focused at a given depth in object 1.

The signal from summer 40 is then passed through a variable frequency filter 45 which is also under the control of real time controller 60. The frequency components of the resulting summed ultrasonic signal are then further processed in signal processing module 50 and sent to scan converter 55 for spatial registration as part of the ultrasound image of object 1 which is then finally displayed for operator viewing on display 60. Display 60 is typically a video monitor.

Transducer 8 in the present invention is a wideband matched impedance transducer. One continuing problem in ultrasound imaging systems has been the efficient conversion of electrical energy to acoustic energy when the piezoelectric transducer material has a different acoustic impedance than the human body. The matched impedance transducer 8 greatly improves such energy transfer.

In addition, strong ultrasonic signals reflected from nearby targets are repeatedly reflected back from the transducer face to the body, thereby causing an annoying haze in the image unrelated to any anatomical structure. The matched impedance transducer 8 utilized by the present invention greatly reduces the acoustic reverberations within the transducer, as well as between the transducer face and the object 1.

Furthermore, the matched impedance transducer 8 of the present invention provides increased bandwidth. Typical bandwidths of the matched impedance transducers of the present invention are nearly twice as large as the bandwidths of conventional "wideband" transducers. The currently preferred embodiment of transducer 8 is a linear array (-based) transducer having many individual transducer elements 9 which are constructed from a composite piezoelectric material. Transducer 8 transmits into and receives ultrasonic pulses from an object 1, such as a human body, being focused in both transmission and reception according to the present invention.

Ultrasonic pulses are reflected from the targets, such as target 2, which might be a tumor and boundaries which might be a bladder wall or the diaphragm within object 1. These reflected echo signals are received by typical transducer element 9 and sent to element select switches 20. These element select switches 20 allow individual array elements to be turned on or off by real time controller 60, depending on the nature of the focusing and scanning being performed.

To receive the small voltage signals resulting from the received ultrasonic pulses, transmit/receive switch 26, also under control of real time controller 60, is used to electrically isolate the high gain receiver 28 from the large voltage pulse generated by variable transmitter 27. Without this switch 26, receiver 28 would be over-loaded for a long time period after the transmitted signal, which would result in a loss of received echo signals close to the transducer. Receiver 28 amplifies the small signals from transducer array 8 so that they are substantially larger than any stray noise which might arise in cross-point switch matrix 30.

Cross-point matrix switch 30 allows various combinations of array elements to be connected together for subsequent processing in focusing time delay module 35. Time delay module 35 introduces appropriate time delays between the signals coming from elements of the array in order to provide focusing on receive. Time delay module 35 is also under the control of real time controller 60 which generally adjusts the various time delays rapidly and within a single line to provide a variable depth focus. This focus is changed very rapidly, often at the speed of sound, so that as the transmitted pulse propagates into the object, the reflected signals are kept in focus.

Summer 40 simply adds the delayed signals from the various elements of array 8 such that a single signal is obtained. In the case of a single focal point on transmit and at the same focal point on receive (i.e., static focusing), this signal is in principle identical to that which would be received from a single element transducer focused with an acoustic lens.

Variable frequency filter 45, under control of real time controller 60, allows certain frequency components of the signal to be selected and passed on to additional signal processing 50, scan converter 55 and finally to the operator viewable display 60. The variable frequency filter 45 has two primary functions. First, its center frequency is adjusted with depth to match the spectral components of the returning signals when object 1 is a human body. Such frequency dependent attenuation creates a progressive loss with depth of high frequency pulse components and is a particular characteristic of soft tissue which is generally different than other materials. In addition, variable frequency filter 45, when used in conjunction with changes in transmitted frequencies generated by variable transmitter 27, improves the discrimination between zones in the image allowing improved energy concentration.

Signal processing module 50 performs such functions as demodulation, additional filtering, Doppler or other flow detection processing and other kinds of vector processing well-known to those skilled in the art.

Scan converter 55 is generally a large two dimensional digital memory typically composed of at least 512 by 512 eight bit memory locations, although it may be much larger than that. This memory serves as a storage means for the vector information from a single line of ultrasound echoes. The scan conversion process converts such a vector, which in general may be oriented in any straight line direction, into a so-called raster scanning format which is suitable for display 60. Display 60 is a standard television or computer type monitor.

Transmit and Receive Focusing in the Present Invention

The present invention provides a method and means for focusing the beam at all depths within an object on transmit and receive of the ultrasonic pulses. In order to do this, the currently preferred embodiment of the present invention uses several parameters to concentrate the transmitted sound energy at a specific depth and to selectively receive reflected energy from the same depths.

By concentrating energy on transmission and selecting reflected energy on reception successive pulses can be designed for minimum interference with previous pulses. By preventing pulses from interfering with one another, more pulses can be sent and received in a given time period, allowing more focal zones to be used in a real-time image without slowing the imaging frame rate down. More focal zones also means better resolution and image quality. Thus, image quality is improved without sacrificing any real time properties.

To transmit pulses so that they focus at different depths successively or to change the focus on reception, the system must rapidly change the relevant parameters. The present invention uses high speed reconfiguration through a real time controller. During the creation of an image, many or all parameters are completely reprogrammed at much faster rates than previously used in other systems. With such rapid programmability and using the methods of the present invention, the time between successive transmit pulses may be made much shorter than before, such that more transmit bursts are available per image.

With precision energy concentration of transmit and selective energy reception, together with high speed reconfiguration, there is no need to wait for the entire line to be received before transmitting the next pulse. Instead, shortly after the data is received from a given depth or zone in the object, ultrasound can be transmitted again.

The present invention allows for transmit and receive focus over an extended field of view, while maintaining a clinically usable frame rate. An example of the benefits of localizing the focus on transmit according to the present invention is shown in FIG. 2. FIG. 2 depicts an example of a three zone case for simplicity, however, it should be noted that the present invention is not limited to using only three zones. FIG. 2A depicts an object being imaged. Referring to FIG. 2A, probe 10 containing transducer array 8 is applied to object 1, usually a human body, to image an internal structure 2. Other aspects of the ultrasound system as described in FIG. 1 are omitted from FIG. 2A to avoid obscuring the figure. FIG. 2B depicts the B- scan display 60 of the ultrasound system. For simplicity, the ultrasound system is shown as a linear array which produces a series of parallel vertical lines of ultrasound data 56 on display 60.

In FIG. 2A, vertical lines 3 are drawn through object 1 and internal structure 2 to depict the successive scanning positions of the ultrasound system. Line 3a is drawn so that it intersects the boundary of structure two at points 4 and 6. Line 3a also intersect another internal structure at point 5. The ultrasound system faithfully displays echoes from points 4 and 6 as points 57 and 59 respectively, and point 5 as point 58 in FIG. 2B. Points 57, 58 and 59 appear in zones Z1, Z2 and Z3 respectively of the display. Each of zones Z1, Z2 and Z3 correspond to a distinct depth into the body. To complete the image of object 1 and its internal structure 2, the system repeats such vertical scanning lines rapidly to form an entire B-scan image in real time. It should be noted that there are no moving parts and that all scanning is performed electronically. Once again referring to FIG. 2B and specifically the vertical line 56a containing points 57, 58 and 59, it should be noted that each of these points are depicted to be in zones 1, 2 and 3 respectively.

FIG. 2C which is representative of prior art systems with multi-zone focusing, depicts several successive ultrasound pulses P1, P2 and P3, along line 3a (FIG. 2A) with resulting echo times displayed on a horizontal axis as $t_0$–$t_{11}$. Pulse P1 is transmitted at time $t_0$. Echoes 3e through 5e are received from points 3 through 5 (FIG. 2A) at time delays corresponding to the travel time of pulse P1 from transducer 10 to the respective point and back to transducer 10. In FIG. 2C, echo 3e appears between time $t_0$ to $t_1$, echo 4e between time $t_1$ and $t_2$ and echo 5e between time $t_2$ and $t_3$ for pulse P1. It should be noted that pulse P1 generates echoes 3e through 5e and this prior art ultrasound system, which focuses the transmitted pulse in zone Z1, only displays the information from zone 1 which in this case is echo 3e. Echoes 4e and 5e are not displayed for pulse P1.

After an additional time delay (from $t_3$ to $t_4$) which is commonly referred to as a guard time, pulse P2 is then sent at time $t_4$, with the transmit focus set to zone Z2 and echo 4e is displayed. Once again, echoes 3e, 4e and 5e all occur from pulse P2. As shown, echo 3e occurs between time $t_4$ and $t_5$, echo 4e appears between time $t_5$ and $t_6$, and echo 5e appears between time $t_6$ and $t_7$. Similarly, pulse P3 is sent at time $t_8$ after an additional guard time (from $t_7$ to $t_8$) and used to focus in zone 3 and echo 5e may be displayed. Once again, echoes 3e, 4e and 5e are also produced by pulse P3 between times $t_8$ and $t_9$, $t_9$ and $t_{10}$, and $t_{10}$ and $t_{11}$ respectively. Each segment of data from the respective zones is spliced together in scan converter 55 to form a continuous image on display 60.

Note that for each pulse, echoes from all points along the line 3a return to the transducer array. Furthermore, note that there is a delay time between the end of zone 1, (i.e., $t_1$) and the time when P2 is generated, that is the time between $t_1$ and $t_4$ which is denoted $tc_{12}$ in FIG. 2C. Similarly, a delay time exists between the end of zone 2 (i.e., $t_6$) and the time when pulse P3 is generated (i.e., the time between time $t_7$ and $t_8$).

This time tc is defined as the "critical time". The critical time is the minimum time between pulses to avoid artifacts in the image. Note that the time interval tc varies between pulses in FIG. 2C and that there is the additional guard time (e.g., time $t_3$–$t_4$ and time $t_7$–$t_8$) to insure that there are no extraneous pulses. Furthermore, note that these critical times determine the maximum pulse rate and, for a constant ultrasound line density in the image, therefore, the maximum frame rate of the real time imaging system.

This problem of artifact, well known to those skilled in the art, is depicted in FIG. 2D where a person attempts to increase the frame rate by violating this minimum critical time constraint and has not included any guard time. In this naive approach, pulse P1 is sent at time $t_0$ and is the same as before, such that the same echoes 3e, 4e and 5e are provided at the same times as in FIG. 2C. Pulse P2 is sent immediately after the end of zone Z1 (i.e., at time $t_1$) in violation of the minimum critical time. In this case, pulse P2 is sent at time $t_1$ and produces echo 3e during time $t_1$–$t_2$, echo 4e during time $t_2$–$t_3$, and echo 5e during time $t_4$–$t_5$. Note that echoes 4e and 5e are still returning to the transducer while additional echoes from pulse P2 begin to return. Since the ultrasound circuitry only can process the echoes it receives, there is no way to distinguish the echoes. In particular, in zone 2, the system sees echoes 4e and 3e superimposed. If pulse P3 is sent too soon, it can be seen that an echo 3e may also be superimposed in the received signals from zone Z2, further confounding the image through artifact. Although this particularly simple example with only a few points is clearly a problem, when a complex structure is imaged this problem becomes insurmountable in the prior art.

The details of the present invention and how it improves the imaging capabilities of an ultrasound system are shown in FIG. 2E. Referring to FIG. 2E, pulse P1 is sent at time $t_0$ to focus in zone Z1 and does so between time $t_0$ and $t_1$. Pulse P2 is sent at time $t_2$ after a guard delay from time $t_1$ to $t_2$ and is sent to focus in zone Z2, which it does during time $t_3$–$t_4$. Pulse P3 is sent at time $t_5$ after a guard delay time from time $t_4$ to $t_5$ and after the focus of pulse P2 between time $t_3$ and $t_4$. Note that in the received echoes from pulse P1, only echo 3e (from $t_0$–$t_1$) from zone Z1 is present. Echoes 4e and 5e are not there to confound the image as in FIG. 2D. Similarly, in pulse P2, only echo 4e (during time $t_3$ to $t_4$) from zone Z2 is present. Likewise, in pulse P3, only echo 5e (during time $t_7$ to $t_8$) from zone Z2 is present.

Thus, provided there is a way to selectively choose echoes from a given zone and to suppress echoes from other zones, the critical time can be reduced and higher frame rates can be achieved. Methods for suppressing such echoes from other zones comprise an important aspect of invention disclosed herein. Furthermore, using techniques described below, the guard time may be effectively eliminated leading to even further improvements in pulse rate and frame rate.

To reiterate, if the same three zones were obtained using prior art multi-zone techniques, pulse P2 could not be transmitted until all of the echoes due to pulse P1 had been received (i.e., time $t_4$). Likewise, pulse P3 could not be transmitted until all of the echoes due to pulse P2 had been received (i.e., time $t_8$). Thus, using prior art multi-zone techniques, the same three zone diagram would require eleven time periods (i.e., time $t_0$–$t_{11}$). Therefore, the present invention provides a significant time advantage over the prior art.

It will also be obvious to those skilled in the art that the number of zones that can be utilized is not limited to three as in the example shown in FIG. 2A, B, C, D and E and that the number of zones can be greatly increased, further contributing to improved resolution without sacrificing frame rate. It will also be obvious to those skilled in the art that greatly increasing the number of zones also requires a system which can be rapidly reprogrammed from zone to zone. Thus, for a given frame rate, which is generally determined by the needs of the clinician to view a certain tissue which may be moving, there is a maximum number of zones which can be employed and, therefore, a certain limit to the system resolution and image quality which may achieved with this method. Yet this invention provides significantly more zones and correspondingly better resolution and image quality for a given frame rate than has been possible with prior art.

Precision Energy Concentration of Transmitted Pulses

By localizing the energy at specific depths within the object, the rate at which successive transmit pulses can be sent increases, thereby increasing the frame rate. In order to localize the acoustic energy to a specific region in the body, the present invention sets a variety of transmit parameters, namely:
  1. Center Frequency
  2. Bandwidth
  3. Transmitter Voltage
  4. F-number- One-Dimensional Array
  5. Two-Dimensional Array 6. Zone Sequences
7. Spatially Separated Line Sequences

1. CENTER FREQUENCY

Typical matched impedance probes are inherently wide bandwidth, with fractional bandwidth typically approaching 90 to 100 percent. This means that for a typical 7.5 MHz array transducer, significant energy can be transmitted into the body from 4 MHz to 10 MHz.

In the currently preferred embodiment, center frequency optimization of the transmitted pulse is accomplished by choosing the highest frequency that will penetrate to the zone of interest and using only approximately 50% fractional bandwidths, which is appropriate for imaging. In this manner, the ultrasound pulses are localized to the specific zone and experience maximum attenuation in the following zones, such that any reflected pulses from the following zones are greatly reduced in strength and do not interfere with the transmitted and received energy from the zone of interest.

2. BANDWIDTH

The center frequency and the bandwidth are interrelated since the center frequency and bandwidth of the transmitted pulse are typically set by specifying the pulse width, duty cycle, and number of pulses sent by the transmitter. By optimizing the transmit frequency and bandwidth, the energy can be localized to a specific region. In the currently preferred embodiment, the energy can be varied by varying the number of pulses in the transmitted pulse with depth.

3. TRANSMITTER VOLTAGE

Although not currently used in the present embodiment, localizing the energy to a given zone can further be improved by minimizing the transmit pulse voltage to only that needed to reliably display the full range of echoes. This means that the transmit pulse voltage for each successive zone depth may be increased and to help overcome any returning interference from the previous, lower voltage zones.

4. F-NUMBER

The fourth transmit parameter is the f-number (i.e., aperture size vs. zone depth). As is well known in optics as well as acoustics, the f-number controls the depth of field or the length of the focal region. As the f-number increases, the depth of field increases. Similarly, if the f-number goes down, the depth of the field decreases. A low f-number indicates a large aperture to depth ratio and narrow depth of the field.

In the currently preferred embodiment, the f-number for transmitting to each of the zones is kept low and constant consistent with desired zone sizes and frame rates. By keeping the f-number low and constant, the ultrasound energy is focused more tightly. Keeping the f-number low and constant also helps eliminate interference from targets closer to the transducer because the beam is more spread out.

Maintaining a constant f-number also contributes to keeping the resolution of the image constant. When deep zones are being imaged, there may not be a large enough aperture available to maintain a constant f-number. Thus, maintaining a constant f-number is only possible for relatively near zones.

5. TWO-DIMENSIONAL ARRAYS

Although the above discussion of setting parameters to localize the energy of the ultrasonic pulses has only been discussed in conjunction with a one-dimensional array, it is also applicable to the case of a two-dimensional array composed of a rectangular or square matrix of individual transducer elements together with individual transmitter and receiver circuits as well as switching, focusing and summing circuits appropriate to the array. If such a two-dimensional array is used, the ultrasonic pulses can be focused in both dimensions (in the plane of the B-scan image as well as the plane perpendicular to the image), thereby also focusing the "out-of-plane" energy. By focusing in both directions, a better focus is obtained than in the one-dimensional array. This tighter focus allows even smaller zones to be used because the energy dies out quicker outside the focal region.

6. ZONE SEQUENCES

The sixth parameter to be optimized is the sequence of examining the zones. In the above discussion it has been assumed that each successive transmit pulse is focused to the next adjacent zone deeper in the body. In some circumstances, artifacts may be reduced when transmitting in a different order. For example, when imaging a full bladder, there is a large fluid filled region with very low acoustic attenuation closer to the transducer than deeper, more reflective tissue, such as the bladder wall. In this case, remnants of the reflections from the bladder wall from the first pulse can interfere with subsequent pulses. By transmitting a deep zone immediately before a less reflective zone, the artifacts will be reduced, both because the reflectors beneath the deep zone are small and because the time between transmits is guaranteed to be long because of the long two-way travel time to the deep zone. Therefore, optimizing the sequence of zones for a specific application can often reduce artifacts. This is generally done in special cases to make the system more robust. Note that changing the order of transmission does not increase the frame rate.

7. SPATIALLY SEPARATED ZONES

Another parameter to be optimized in this invention is the sequence of lines in the image. An array ultrasonic imaging system can perform spatially separated line sequences by electronically selecting lines which are widely separated in space. This spatial separation helps ensure that the energy from a previous transmission pulse does not interfere with the current zone.

If the lines are widely separated, after transmitting the first line, the second line can be transmitted immediately after the pulses from the bottom of the zone from the first line are received. This spatial line sequencing can also be combined with zone sequences as described above to produce maximum frame rates with reduced artifacts.

Selective Energy Reception

In the currently preferred embodiment, there are two parameters to be optimized on reception:
1. Dynamic Receive Focusing and F-number- One Dimensional Array
2. Two-Dimensional Array
3. Dynamic Frequency Imaging

1. DYNAMIC RECEIVE FOCUSING AND F-NUMBER - ONE DIMENSIONAL ARRAY

Electronic focusing on reception is also a well-known technique in ultrasound. It is the analog of focusing on transmission, i.e. to focus at the same point in either transmission or reception, the same relative time delays between elements of the array are required.

As in transmission focusing, use of a low f-number in reception improves the ability to selectively localize the region in the object from which echoes are received and to discriminate against other unwanted regions. Low f-numbers result in small focal spot diameter and reduced depth of focus which are both desirable.

2. TWO DIMENSIONAL ARRAY RECEIVE FOCUSING

As described in the case of transmission, a two dimensional array may also be used to further improve the discrimination between desirable signals and those which are unwanted. By using the focusing properties in the plane perpendicular to the image plane in conjunction with conventional in-plane focusing, greatly improved performance may be obtained.

3. DYNAMIC FREQUENCY IMAGING

On reception, variable frequency filter 45, a bandpass filter whose center frequency may be rapidly adjusting, is used in conjunction with variable transmitter 27 to enhance the echoes from a given zone and to discriminate against those from other zones. The center frequency of filter 45 is adjusted to match the frequency of the ultrasound energy returning from the given zone (which was chosen according to preceding discussion of transmit optimization) The center frequency is also coordinated and controlled in conjunction with the parameters loaded from the tables which are discussed below. It should be noted that the dynamic frequency imaging utilized by the currently preferred embodiment of the present invention is only effective if the transducer is sufficiently wideband. Otherwise, the returning signals from all of the depths would have the same approximate frequency content and no depth dependent optimization would occur.

Final Optimization—Application Dependance

Once the transmit parameters have been set (i.e., the number of zones have been determined) and the spot size selected, the critical delays between the ultrasonic pulses are determined from a computer model. These critical time delays are the time delays which result in an acceptable level of artifact and are generally dependent on each specific application.

The final critical time delays are then empirically determined for each set of transmit zones and each application. By being application dependent, the actual time delays (critical time delay plus guard time) vary for each type of application. For example, in a liver imaging application where the tissue is very deep and quite uniform and has little movement, the ultrasonic pulses attenuate rapidly and smoothly with little artifact. In this case, the actual empirical time delays may be as short as the critical time delays.

On the other hand, in applications where there fluids are involved, such as bladders and obstetrics, the ultrasonic pulses do not die off as quickly and deep bright reflectors are located beneath nearby echo free regions. In this case, additional guard times may be used and the actual empirically determined time delays may be longer than the critical time delays.

In the currently preferred embodiment, for each zone N, the time delay until the next transmit is either the critical time delay or the critical time delay plus a guard time. The critical time delay tc is determined according to the equation below:

$$t_c = \frac{2Z_b(n)}{c} \quad (1)$$

where $Z_b(n)$=depth to the bottom of the nth zone and c is the speed of sound in tissue (which is assumed to be a constant). The transmit time delay is the greater of the critical time delays or the critical time plus the guard time, which is application dependent and must be empirically determined.

According to the present invention, each of these parameters are changed on a zone-by-zone basis in transmission, such that the energy from the ultrasonic wave is localized to the zone of interest and thereafter, attenuates quickly so that there is a reduced or acceptable level of artifact due to other pulses.

To reiterate, by setting the transmit parameters, the present invention allows the ultrasound imaging system to have a larger number of zones at a given frame rate, thus ensuring that the impulse response of the focusing system (i.e., the spot size) is subject to small, smooth variations with depth. By maintaining a relatively constant spot size, the focal quality of the image over an extended range of depth is consistent and substantially improved over the prior art.

Selection of Application Dependent Parameters Through Icons

In one embodiment, sets of transmit parameters, including transmit delays, are stored in the system control memory as tables which can be accessed by the operator. A processor (not shown), such as the 68010 brand processor manufactured by Motorola Corporation of Texas, downloads the parameters to the ultrasound system. An example of one such table is shown in Appendix A. System controller (FIG. 1) may have been an operator interface which is displayed on display 60 and includes a set of icons, each corresponding to a set of tables.

When an icon is selected, the disk storing the tables is accessed. In one embodiment, the information includes transmit delays, the zone boundaries, the transmit frequencies, etc. for four confocal orders for that specific application. When an order is selected, the parameters in that table are loaded into the real time controller 60 and imaging can begin. In one embodiment, the operator interface utilizes icons to represent a specific application. By selecting an icon, the operator immediately accesses a particular set of tables from the memory which represent the optimum set of parameter values consistent with the application.

In one embodiment each icon has a choice of four application specific "orders" of confocal imaging: A, B, C and D. When selecting A, the user is selecting the table which has the poorest resolution but has the maximum frame rate and lowest level of artifacts. Orders B through D have progressively higher image quality, potentially higher levels of artifact, and lower frame rates. Each set of orders, and the parameter trade-offs among the orders, is different for each application.

The combination of methods for precision energy concentration and the flexibility of application dependent optimization provides for imaging capabilities that were not possible in previous systems. For example, a 3.5 MHz probe may be used in several different applications ranging from looking for small stones in the bladder to detecting subtle tissue variations in the liver. For the bladder application, it is necessary to keep the bladder free from artifacts that might obscure the small stones.

For this icon order A would be set with very long critical times to ensure that no reverberation artifacts would appear. Order D would use shorter critical times, but might include half line scanning and more zones for situations where resolving a small lesion is required. Orders B and C would provide intermediate levels of trade-offs to ensure that a nearly optimal setting is available for all bladder applications.

The four orders available for the abdominal-liver icon are optimized based on different considerations. Order A requires some protection against artifacts, but substantially less than for the bladder. Since resolution is more important in this application, three simultaneous zones might be used even in the "low" resolution order. Order D would make full use of precision energy concentration by using a larger number of zones than were previously possible while maintaining usable frame rates. This high ultra-high resolution mode would be used for diagnosing subtle texture variations. Again levels B and C would have intermediate values to provide smooth transition between Order A and Order D and to account for the range of patient and pathology differences expected in liver imaging applications.

Previous systems utilized only a few parameter selections to span all applications. Precision energy concentration thus permits a much greater range of optimization in imaging than was previously possible. Application dependent orders then allow for easy and logical adaptation to patient variables and pathological differences.

In another embodiment, only two confocal orders are used, wherein each if sub-divided into three parts (easy, moderate and difficult) based on the measure of examination difficulty with respect to the patients. Examples of these tables are also included in Appendix A.

Referring to the tables in Appendix A, the sector size indicates the probe type, where a sector size of 0 indicates a flat probe. The focal starting point (Foc. Start) and focal stopping point (Foc. Stop) indicates the beginning and ending locations of the confocal imaging. The fire first (Fire First) indicates whether all of the vectors for a particular zone are fired before going to the next zone (indicate by ZONE) or whether all of the vectors for each line are fired before going to the next line (indicated by LINE). The vector direction (Vector Dir.) indicates the direction of scanning. For instance, LFT/RHT indicates that the scanning occurs from left to right across the zones, while RHT/LFT indicates the scanning if from right to left. The zone direction (Zone Dir.) indicates the order of the zones. For instance, TOP/BOT indicates that the zones are scanned from top to bottom, and BOT/TOP indicates that the zones are scanned from bottom to top. The vector spacing (Vec. Spacing is the spacing between vectors and is determined, in one embodiment, by $$\left\lfloor \frac{n}{s} \right\rfloor.$$

Zone spacing represents the spacing between the zones and is determined, in one embodiment, by the equation $$\left\lfloor \frac{z}{s} \right\rfloor.$$

The half-line scanning (H.L. type) indicates the half-line scanning type, whether it be done traditionally (ODD/EVEN) or by micro-steering the beam (MICRO).

The Currently Preferred Embodiment of the Confocal Focusing Method

The currently preferred embodiment for selecting the parameter used in the confocal focusing method of the present invention is shown in FIG. 3. Referring to FIG. 3, the transmit focusing method 300 comprises initially selecting an f-number (block 301). After an f-number has been selected, the transmit frequency curve is selected (block 302). Then the zone boundaries are selected (block 303). Once the zone boundaries have been selected, any necessary adjustments are performed (block 304). After adjustments, the guard times are set (block 305). Following the generation of any necessary guard times, the area where focusing is required is selected (block 306). Next, the frame rate is selected (block 307). Each of these steps are discussed below in order.

In actuality, the first step in optimizing the transmission parameters is the selection of a probe. Probes can be characterized by their center frequency $f_0$, their bandwidth $\sigma_0$ and their element dimensions. Once the probe has been selected, the transmit focusing method 300 may start.

1. SELECTION OF F-NUMBER

The f-number is the ratio between the distance from the face of the probe to the focus and the size of the aperture. As the f-number increases, the depth of field increases. Similarly, as the f-number decreases, the depth of field goes down. A low f-number indicates a large aperture, such that the depth of field is very small. Focusing ultrasonic waves in a small depth of field requires a "tighter" or stronger focus because the transmitted ultrasonic waves quickly become out of focus. In other words, a strong focus not only localizes the energy, but also causes the energy to diverge rapidly. By diverging rapidly, discontinuities and targets within the zone are not isonified with strong ultrasonic wave energy, thereby reducing the amount of reflection (i.e., echoes). Thus, when the reflected waves are not in focus, the spatial resolution in the zone diminishes. To ensure that the maximum amount of the zone is isonified with focused energy, the f-number is chosen so that small depths of field (i.e., tightly focused beams) have smaller transmit zones.

Since the f-number is related to the size of the zones, in the present invention the f-number selection is related to the frame rate. The lower the f-number, the lower the frame rate. In the currently preferred embodiment, imaging parameters are derived for a variety of f numbers. Each f-number corresponds to a different frame rate for the imaging system. Therefore, in the currently preferred embodiment, the f-number is selected accordingly by selecting the frame rate. For instance, an f-number of 1.5 is selected by choosing a low frame rate. (A low frame rate does, however, produce a high resolution.) Similarly, an f-number of 3.0 is selected by choosing a high frame rate. (A high frame rate produces a lower resolution). Thus, the sonographer may select the appropriate resolution an frame rate according to the particular application.

2. ESTIMATE THE TRANSMIT FREQUENCY CURVE

Once the f-number is selected, the transmit frequency curve is selected (processing block 302). One of the major advantages of the present invention is the optimization of transmit frequency within each transmit focal zone. Optimizing the transmit frequency, in conjunction with dynamic bandpass filtering of the received echo signals, allows for increased resolution at shallow depths, and increased penetration deep within a single image. Furthermore, the optimization also provides for the best drop-off characteristics for the pulse after the zone.

The higher the frequency, the better the temporal resolution. Characteristically, however, the higher the frequency of the ultrasonic waves, the lower the penetration into the body. Likewise, the lower the frequency, the greater the penetration into the body. By varying the transmit frequency as a function of the changing depths transmit zones, the present invention capitalizes on the inherent frequency attenuation effects of ultrasonic waves in the body. In the present invention, at shallow depths, where attenuation is not a problem, the transmit frequency can be set high in order to produce the highest resolution, while the frequency is set lower for deeper zones of ultrasonic wave.

Transmit frequency is estimated to produce the best penetration. In the currently preferred embodiment of the present invention, the transmit frequency which produces the best penetration is estimated by assuming that the transmitter that produces a single unipolar pulse whose maximum voltage is fixed and produces pulses with a shape that is roughly Gaussian in nature. The effective frequency of the pulse is determined according to its temporal width. In the currently preferred embodiment, it is also assumed that the transducer can be modeled as having a linear transfer function from voltage derived to and from the acoustic energy. Finally, the currently preferred embodiment assumes that the anelastic attenuation in the body (i.e., the average value of tissue attenuation) is represented by a constant "Q". Under these assumptions, the spectrum of a pulse traveling to the bottom of the focal zone and back (i.e., a round trip journey) is the product of the frequency spectrum of the pulse, the two way transfer function, and the two way attenuation curve.

If the transmit pulse has a width $\sigma$, then the amplitude of its spectrum is proportional to:

$$\frac{1}{\sigma_f} e^{-\frac{f^2}{2\sigma_f^2}}$$

where $\sigma_f = 1/(2\pi\sigma_1)$ is the effective frequency of the pulse. For a center frequency $f_0$ and a bandwidth $\sigma_0$ of the probe, the resulting waveform or pulse before attenuation has a frequency spectrum proportional to:

$$\frac{1}{\sigma_f} e^{-\frac{f^2}{2\sigma_f^2}} \times e^{-\frac{(f-f_0)^2}{2\sigma_0^2}}$$

The expression above can be reduced to a Gaussian of the form:

$$A_1 e^{-\frac{(f-f_1)^2}{2\sigma_1^2}}$$

with $$\sigma_1^2 = \frac{\sigma_f^2 \sigma_0^2}{\sigma_f^2 + \sigma_0^2}$$

$$f_1 = \frac{f_0 \sigma_1^2}{\sigma_0^2} = f_0 \frac{\sigma_f^2}{\sigma_0^2 + \sigma_f^2}$$

and:

$$A_1 = \frac{1}{\sigma_f} e^{-\frac{f_0^2}{2(\sigma_0^2 + \sigma_f^2)}}$$

The effect of the attenuation is to shift this response to another Gaussian. Including effect of the attenuation results in a frequency spectrum represented by:

$$A_1 e^{-\frac{(f-f_1)^2}{2\sigma_1^2}} e^{-\alpha z |f|}$$

where $\alpha$ is the attenuation parameter and z is the depth of the focal zone. Assuming $\alpha z \sigma^{2/1}$ the final frequency spectrum is represented by:

$$A_2 e^{-\frac{(f-f_2)^2}{2\sigma_2^2}}$$

where:

$$A_2 = A_1 e^{\frac{-2\alpha z f_1 + (\alpha z \sigma_1)^2}{2}} = \frac{1}{\sigma_f} e^{-\frac{f_0^2 + 2\alpha z \sigma_f^2 f_0 - (\alpha z \sigma_0 \sigma_f)^2}{2(\sigma_0^2 + \sigma_f^2)}}$$

$$f_2 = f_1 - \alpha z \sigma_1^2 = (f_0 - \alpha z \sigma_0^2)\left(\frac{\sigma_f^2}{\sigma_0^2 + \sigma_f^2}\right)$$

$$\sigma_2^2 = \sigma_1^2 = \frac{\sigma_0^2 \sigma_f^2}{\sigma_0^2 + \sigma_f^2}$$

The amplitude of the time domain pulse (ignoring dispersion) is proportional to:

$$A_2 \sigma_2 = \frac{\sigma_0}{\sqrt{\sigma_0^2 + \sigma_f^2}} e^{-\frac{f_0^2 + 2\alpha z \sigma_2^2 f_0 - (\alpha z \sigma_0 \sigma_f)^2}{2(\sigma_0^2 + \sigma_f^2)}}$$

The transmit pulse frequency width $\sigma_{amp}$ that maximizes this amplitude is then given by the equation:

$$\sigma_{amp}^2 = f_0^2 - \sigma_0^2(1 + 2\alpha z f_0 - (\alpha z \sigma_0)^2)$$

and the resulting maximum amplitude (normalized to $z = 0$) and associated frequency for the zone becomes:

$$A_{amp} \propto \frac{1}{1 - \alpha z \sigma_0 \left(\frac{\sigma_0}{f_0}\right)} e^{\frac{-2\alpha z f_0 + (\alpha z \sigma_0)^2}{2}}$$

$$f_{amp} = f_0\left(1 - \left(\frac{\sigma_0}{f_0}\right)^2 - az\sigma_0\left(\frac{\sigma_0}{f_0}\right)\right)$$

FIG. 4 shows an example of the estimated frequency curve using the above approximations, the transmitter frequency $\sigma_{amp}$ and the center frequency of the received pulse $f_{amp}$ as a function of transmit zone depth for a probe having a 7.5 MHz center frequency $f_0$ and 66% bandwidth (i.e., $\sigma_0 \approx 2.0$ MHz). Referring to FIG. 4, above a certain depth, shown as 4 cm, the signal pulse has sufficient amplitude, $A_{enough}$, to fully utilize the dynamic range of the display. Above this depth, it is advantageous to raise the transmit frequency in order to improve resolution. Assuming $\sigma_f >> \sigma_0$, the best resolution is obtained with a transmit pulse of $$\sigma_{res} = \frac{A_{amp}(0)}{A_{enough}} e^{-azf_0}$$

where $A_{amp}(0)$ is the maximum amplitude at $z=0$. In actuality, this is not a severe constraint on the transmit frequency. As FIG. 4 depicts, while the above expressions for $\sigma_{amp}$ and $\sigma_{res}$ are useful for setting the transmit frequencies, the actual center frequency received at the probe varies only slightly from the simple case of $\sigma_f \to \infty$, or $$f_\infty = f_0\left(1 - az\sigma_0\left(\frac{\sigma_0}{f}\right)\right)$$

In other words, the center frequency of the transmitted pulse (shown as the thick curve) varies only slightly from the case of broad band excitation, $f_\infty$.

In sum, the transmit frequency is lowered for deep zones to increase the energy of the returning signal, while in shallow zones, the transmit frequency is raised to improve resolution, maintain a constant signal strength and insure rapid attenuation below the focal zone.

In actuality, more elaborate pulse control allows even greater flexibility in adjusting the transmit frequency characteristics. However, any pulse control scheme subsequently used must calculate according to the center frequency of the pulse after two-way travel. Since the optimization of transmit pulse characteristics has only a moderate effect on this frequency function, the full bandwidth approximation $f_\infty$, below, can be used.

$$f_\infty = f_0\left(1 - az\sigma_0\left(\frac{\sigma_0}{f_0}\right)\right)$$

in the estimation of zone boundaries, where $\alpha$ is the attenuation constant (roughly 1 dB/(cm MHz)) and z is the depth to the center of the zone.

3. SELECT THE ZONE BOUNDARIES

Once the frequency curve has been established, the zone boundaries are selected (processing block 303). In essence, selecting the zone boundaries, selects the number of zones. It should be noted that the number and size of the zones can be chosen according to the specific application of the ultrasonic imaging system. It is convenient to characterize the behavior of the beam near the focus by the average phase error $\Phi$ on the zone boundaries. Fixing the phase error to be the same at every zone boundary guarantees a bound on the variation in the beam width, and continuity of the beam across the boundaries.

One goal of the present invention is to maintain consistent focal quality over an extended region of depth in an ultrasound image. To maintain consistent focal quality, the system's minimum lateral resolution, or spot size, undergoes only small, smooth variations with depth. As stated previously, since each transmit zone has a single frequency and aperture size, the size of the transmit zones must remain "small". By specifying a maximum average phase error on the zone boundaries, specific limits on the variations on the lateral extent of the impulse response (i.e., the spot size) are set.

FIG. 5 illustrates a transducer 51 in relationship to a focal point 52. Transducer 51 is aligned with focal point 52, such that the focal point 52 is distance z away from transducer 51. Furthermore, one of the elements of the array located a distance x away from the center of the transducer is a distance r from focal point 52. Referring to FIG. 5, assuming geometric acoustics, the delay d (x) (expressed in units of length) required to focus a beam at a depth z is given by the equation:

$$d(x) = z - \sqrt{r^2 - z^2}$$

Or for $x/z << 1$:

$$d(x) \approx \frac{1}{2} \frac{x^2}{z}$$

The delay errors e (x, $\Delta z$) at a depth $z+\Delta z$ due to this delay profile would then be represented by:

$$e(x,dz) \approx \frac{1}{2} \frac{x^2}{(z + \Delta z)} - \frac{1}{2} \frac{x^2}{z}$$

or where $\Delta z$ is small:

$$e(x,\Delta z) \approx \frac{1}{2} \frac{x^2}{z^2} \Delta z$$

This delay error, averaged over the aperture, is a measure of how far out of focus a beam is. For a one-dimensional aperture of length, the average delay error D ($\Delta z$) becomes:

$$D(\Delta z) = \frac{1}{a} \int_{-a/2}^{a/2} dx \left(\frac{1}{2} \frac{x^2}{z^2} \Delta z\right) = \frac{1}{24} \frac{\Delta z}{f^2}$$

where $f=z/a$ is the f-number at the focal point. If the relative phase error $\Phi$ is defined as the ratio between this delay error expressed as a fraction of wavelength $\lambda$ of the center frequency of the transmitted pulse, then the relative pulse error $\Phi$ is represented by the equation:

$$\Phi = \frac{1}{24} \frac{\Delta z}{f^2 \lambda}$$

where $\Delta z$ is the distance from the center of the zone to the zone boundary, f is the f-number, lambda=$c/f_\leq$) is the wavelength of the pulse and c is the velocity of sound.

Selecting transmit zone sizes that limit this phase error restricts the variations in the amplitude and axial resolution of the beam. In the currently preferred embodiment, the "depth of focus" of a beam is defined as twice the distance between the focal point and the depth where the beam is laterally broader by a factor of $\sqrt{2}$. Using $3f^2\lambda$ to represent the depth of focus, and assuming the beam spreads quadratically near the focus, then the beam width is approximately:

$$b \approx b_0 \left(1 + (\sqrt{2} - 1)\left(\frac{\Delta z}{\frac{3}{2}f^2\lambda}\right)\right)$$

where $b_0$ is the beam width at the focal point. In terms of the relative phase error $\Phi$, the fractional change in the beam width is approximately given by the equation:

$$\frac{b - b_0}{b_0} = (10\Phi)^2$$

For example, according to the above expression, a maximum phase error of 0.05 guarantees that the spot size will not vary by more than 25% in the zone. A similar relationship holds for the fractionally change in beam intensity.

Again, compromises are made between image quality and frame rate. Small phase errors produce very smooth beams. For large f numbers, small phase errors can be used because the zones are large. Because of the large zones, the frame rate will be higher. Small f numbers require smaller zones. Because of the small zones, the frame rate will be lower. Therefore, to improve the lower frame rate, the phase errors can be made larger. In the currently preferred embodiment, the phase errors are kept small and constant at the zone boundaries. By doing this, banding is prevented and, thus, image quality improves.

Given the f-number, frequency function and the phase error, the position of the zone boundaries and the aperture size for each zone can be calculated by the following algorithm. Given the location of the top of the first zone, the bottom of the zone is incremented in small amounts of distance, effectively lengthening the zone. For each increment to the zone depth, the center frequency, aperture size and associated phase error are calculated according to the bottom of the zone. The deepest zone boundary that does not exceed the allowable phase error becomes the end of the zone and, therefore, the top of the next zone. This method is repeated until the maximum desired depth has been reached or the maximum number of zones has been exceeded.

In the currently preferred embodiment, the above steps to generate the zones boundaries are accomplished using a computer program. In the currently preferred embodiment, the computer program is written in the programming language "C" and is contained in Appendix B. A typical output list is also included in Appendix B.

4. ADJUSTMENTS

These "first pass" estimates for the imaging parameters are sufficient to produce good images. However, fine adjustments can compensate for effects not fully considered and accommodated up to this point (processing block 304).

One such adjustment involves out of plane energy. Linear arrays used in modern ultrasound imaging usually employ a lens that focuses the out of plane energy at a fixed depth. In the region of the fixed depth, the beam characteristics may change significantly from zone to zone. By decreasing the size of the zones in this region, the discontinuities are reduced in amplitude and beam width is reduced to an acceptable level. If the zone boundaries are moved, the aperture size must be recalculated for each zone. Therefore, the selection of f-number step (301) must be repeated.

Another adjustment is made to compensate for the limits in aperture. At some depth in the image, all of the available aperture will be used. Below this depth, it is impossible to maintain a constant f-number. By maintaining a constant phase error in this region, the zones become large. In the currently preferred embodiment, a maximum zone size is usually determined heuristically and maintained below this depth.

Another adjustment that may be required is due to the inherent faults in utilizing approximations in the previously utilized derivations. Differences between the geometric focus and the actual acoustic focus of the transducer can cause the focus to be shifted slightly from the center of a zone. In the currently preferred embodiment, the center of the geometric focus is adjusted by hand in each zone until the brightest part of the beam is in the center of the zone to compensate for this difference. This also insures that the beam size is continuous across the zone boundaries.

The transmit frequencies in each zone may also be fine tuned to maximize resolution in the shallow zones and penetration in the deep zones. The transmit parameters can be modified to eliminate any noticeable gain discontinuity, if any, from zone to zone. This can usually be accomplished adjusting the transmit parameters which only limit the maximum depth of penetration. For example, in the currently preferred embodiment, if a zone is brighter an adjacent zone then, the transmit frequency may be raised slightly in the bright zone to produce a smoother gain profile, without significantly affecting the beam width.

5. SETTING THE GUARD TIMES

After the zone boundaries have been set, any necessary guard times for firing focused ultrasonic waves are determined (processing block 305). It should be noted that guard times may not be required when transmit bursts are fired in rapid succession across the same zone (i.e., are swept across the zone). While receiving energy from a zone, energy returning from the previous pulse is returning from deeper in the body. Acoustic wave propagation energy is attenuated according to the equation:

$$\text{attenuation } (dB) \approx \alpha z f_0$$

Typically about 40 dB of signal is displayed in an ultrasound image. If the energy from the previous zone attenuates by 50 dB, a 10 dB "safety zone" to account for variations in scattering intensity in the body would exist. For example, with a 7.5 MHz probe and a 1 dB/(cm MHz) attenuation, each transmit line segment waits a time equivalent to 6.67 cm. For an image with this depth, the amount of dead time roughly doubles the time required to produce each frame as compared to the method employed by the present invention (i.e., firing immediately after the bottom of each zone has been received).

There are a number of factors that can modify the required dead time. One of the factors relates to when small f numbers are used. Zones which have a small f-number are the smallest and therefore are limited by frame rate. However, tightly focused beams diverge rapidly beyond the focal point. Therefore, the effective attenuation can be much greater than for the plane wave approximation. In addition, the transmit frequencies in the near zones are higher than in the deeper zones and diminish faster than the lower frequencies.

Application specific influences due to the physiology of the human body also influence delay times. For instance, when a probe is imaging a neck, there are no bright reflectors deep in the image, so the 10 dB guard band is not required. On the other hand, when imaging the heart or the abdomen, deep interfaces exist that are strong reflectors. In this case a 10 dB guard band may not be enough.

In the currently preferred embodiment, the critical delay time parameter is initially set to the 50 dB level based on the center frequency of the probe. This level is then varied until the maximum acceptable artifact is seen during clinical applications. In effect, the level is lowered. It should be noted that the critical time delays are different for different applications.

6. SELECT AREA WHERE FOCUSING IS REQUIRED

Once the guard times have been set, the area of focus is selected (processing block 306). Ideally, every transmit zone within the depth of an image would be used to produce that image. However, the frame rates currently are limiting. In most applications, there is a region of interest where a continuous focus is desirable, but above and below that region lower quality focusing can be tolerated. The area of focus is selected by specifying a location to start focusing, such as 2 cm for example, and a location to stop focusing, such as 12 cm for example.

After the start and stop locations for the focusing have been selected, the user selects a desired frame rate (processing block 307). In response to the start and stop location selection and the frame rate selection, the vector density and the number of zones is automatically calculated (processing block 308). These calculations are performed by a processor in the system and the resulting focusing parameter values are downloaded into the imaging system.

It should be noted that generally for each f-number, and potentially for each application, a different number of simultaneous zones is selected. Since the zones are smaller for lower f numbers, more zones are required to generate each line in order to maintain a reasonable range of in-focus depth.

In another embodiment, the line density may be selected. The standard line spacing for linear array probes is equal to the element spacing of the probe, one line per element. A simple option known as half-line scanning doubles this density to 2 lines per element. Half-line scanning produces a better resolution, but also reduces the frame rate by two. For high frequencies and low f numbers, the use of half-line scanning may be desirable to ensure proper spatial sampling. For example, estimating the beam width as $f^2\lambda$ for f/1.5 MHz gives a minimum width of 0.46 mm. A 96 element 40 mm probe has an element spacing of about 0.42 mm. In this case, using standard line density (i.e., scanning) is likely to spatially alias the image.

If the frame rate for half-line scanning is below a pre-described minimum, then full line scanning is used. Using half-line versus full line is very application specific. For applications, such as vascular work in the neck, the frame rate can be set to the minimum rate that makes moving the probe and locating targets annoying, about 8–10 frames per second. Where detailed motion is important, such as the movement of valves for cardiac applications, the frame rate might be set to 30 frames per second, the maximum refresh rate of the video display in the currently preferred embodiment. Similarly with respect to the delay times and number of simultaneous zones, clinical testing is required to evaluate the trade-offs between frame rate and the use of either half-line or full-line scanning.

Although these seven steps are presented in their most logical order they are clearly not independent. Furthermore, in some cases, it may be necessary to start the process over at a certain step and repeat the remaining steps in order to arrive at an acceptable solution.

FIGS. 6A, 6B and 6C show a comparison between conventional multi-zone focusing and the confocal imaging and precise imaging concentration of the present invention. Referring to FIG. 6A, the large zones and small f numbers in the conventional case cause large variation in the beam profile within each zone. Furthermore, the phase errors at the zone boundaries are varied, causing discontinuities in the beam width. It should be noted that the horizontal scale has been exaggerated for clarity. The average beam width of the f/3 confocal imaging example shown in FIG. 6B is about the same as in the converted multi-zone case as shown. However, the variations in the beam size are minimal and the continuity on the zone boundaries is guaranteed by a constant phase error and the fine adjustment of the focal positions generated according to the present invention.

The f/1.5 confocal imagining example shown in FIG. 6C illustrates a tight, smooth, essentially continuous beam. The gain in resolution in the shallow zones in the confocal image of the present invention results from optimizing the transmit frequency in each zone.

The currently preferred embodiment of the confocal imaging of the present invention uses a constant f-number throughout the image, small constant phase errors at the zone boundaries, zone dependent transmit frequencies, depth dependent received filtering, and careful adjustment of the focal position within each zone. By using the above, a smooth seamless beam pattern is generated.

Non-Sequential Scanning

The present invention provides for non-sequential scanning of an object under examination. In the present invention, ultrasound waves are focused in multiple zones, where each of the zones is at a different focal depth. In the present invention, each zone (i.e., focal depth) is completely scanned before scanning at another focal depth. Therefore, all of the vectors, or lines, for a specific depth are transmitted before line segments for a different zone are transmitted.

Since the zones are scanned individually, the multiple zones may be scanned in any order. The zones may be scanned from top (the zone closest to the transducer face) to bottom (the zone furthest from the transducer face), bottom to top, or in any random order. For instance, if there are four zones with the first zone being closest to the transducer face and the fourth zone being furthest from the transducer face, the zones may be scanned from first to fourth (1,2, 3, 4), fourth to first (4, 3, 2, 1), or any random order (e.g., 2,3,4,1; 2,4,1,3; 3,1,4,2; etc.). FIG. 7 illustrates the above example. Referring to FIG. 7, zones 1–4 are shown being scanned from top down to bottom, with zone 1 being the closest to the face of transducer 701. Initially, a scanning operation, represented by transmit vectors 702, is performed on zone 1. After zone 1 has been completely scanned, a second scanning operation, represented by transmit vectors 703, is performed on zone 2. Subsequent to finishing the scan of zone 2, a third scanning operation represented by transmit vectors 704, is performed on zone 3. After zone 3 has been scanned, zone 4 is scanned in the same manner to complete the scanning of the object. Therefore, as shown, a complete sweep of a zone is accomplished before the scanning of another zone occurs.

The individual vectors for each scan do not have to be spaced adjacently to sweep across the zone as in the prior art. In the present invention, transmit vectors are fired such that each subsequently fired transmit vector is fired a predetermined distance from the transmit vector immediately preceding it in time. The predetermined distance is chosen to reduce the lateral interference between adjacent vectors. In one embodiment, the vectors are spaced such that successively fired vectors are one full aperture apart. In the currently preferred embodiment, the transducer has 96 elements, one full aperture corresponds to 48 elements of the transducer.

An example of the spacing of vectors in a zone is shown in FIG. 8. Note that the zone in FIG. 8 represents only one of multiple zones into which vectors are being focused, such as one of zones 1–4 in FIG. 7. Referring to FIG. 8, zone 1 is shown being scanned with multiple transmit vectors. Three of the vectors are shown, i.e., transmit vectors 802, 803, 804. Transmit vector 802 is fired immediately before transmit vector 803. Transmit vector 803 is fired immediately before transmit vector 804. After transmit vector 802 has been fired, the next transmit vector fired in the zone is fired at a line a predetermined distance away from transmit vector 802. In one embodiment, the distance is 1 full aperture. Therefore, transmit vector 803 is fired at a line that is 1 aperture away from the line of transmit vector 802. Likewise, the transmit vector 804 which follows transmit vector 803 is approximately 1 aperture away. Therefore, in the present invention, the aperture is controlled pulse to pulse.

It should be noted that if transmit vectors 802, 803 and 804 are 1 aperture apart, transmit vector 805 is not 1 aperture from transmit vector 804. However, the distance between successively transmitted vectors (e.g., 1 aperture) occurs with respect to vectors fired from one side (e.g., the left side) of the zone to the other side of the zone (e.g., the right side) until the end of the transducer is reached. Then the transmit vectors start over from the line adjacent to the transmit vector which occurred closest to the beginning (e.g., left side) of the zone on the previous pass through the zone. In this case, transmit vector 805 is fired adjacent to transmit vector 802 and transmit vector 806 is one aperture from transmit vector 805. Therefore, the line spacing (s) equals two.

The ordering in which the zones are scanned may be determined by the following equations:

(Equations 1)

$$\frac{i}{\lfloor \frac{z}{s} \rfloor} + \left( i \% \lfloor \frac{z}{s} \rfloor \right) * s, z; i = 0$$

$$\frac{i}{\lfloor \frac{z}{s} \rfloor} + \left( i \% \lfloor \frac{z}{s} \rfloor \right) * s; i = 1, 2, \ldots z - 1$$

where z is the number of foci over depth and s is the spacing between two adjacent zones (or depths, % is the modulo or the remainder of a division operation and $\lfloor \rfloor$ is the integer portion [the floor] (e.g.

$\lfloor 3/2 \rfloor = 1$).

Note the i=0 case includes the additional "z" term to accommodate the situation where z is odd. In this case, the first and last zones are fired in order. For instance, if there are six zones with a zone spacing of 2, the order in which the zones would be scanned are 0, 2, 4, 1, 3, 5. The ordering of transmit vectors may be determined according to the following equation:

(Equations 2)

$$\frac{i}{\lfloor \frac{n}{s} \rfloor} + \left( i \% \lfloor \frac{n}{s} \rfloor \right) * s, n; i = 0$$

$$\frac{i}{\lfloor \frac{n}{s} \rfloor} + \left( i \% \lfloor \frac{n}{s} \rfloor \right) * s; i = 1, 2, \ldots n - 1$$

where n is the vector density per focus depth and s is the spacing between vectors. Note that in the i=0 case, an extra "n" term is included to handle the uneven case. The scanning pattern of the present invention may be achieve by using equations 1 and 2 together to determine the order of zone scanning, as well as the order of transmit vectors for each zone.

In one embodiment, the present invention uses a fixed distance between successively fired vectors. For instance, the distance between vectors could be 1, 2, 3, 4, 5, etc. vectors. The present invention is not limited to using a fixed distance between successively fired vectors.

In the present invention, time can be added between each vector until a distortion field created by a transmit vector decontaminates. However, time can be added by firing the vectors non-sequentially, such that vectors away from the distortion field can be fired while waiting for the distortion to decontaminate. An example of the non-sequential firing of vectors is shown in FIG. 9.

Referring to FIG. 9, transmit vectors 903, 904, 905 and 906 are fired in succession into a zone having a fluid region (not shown) (where the line spacing is s=4). These vectors are spaced evenly with respect to one another. The next transmit vector 907, 908, 909 and 910 are fired in succession. Transmit vector 907 is adjacent to transmit vector 903. Transmit vector 908 is adjacent to transmit vector 903, transmit vector 909 is adjacent to 904, and transmit vector 910 is adjacent to transmit vector 920. Transmit vectors 904 fired at the fluid region will likely result in distortion. In the present invention, the spacing between adjacent vectors is reduced.

In this manner, a longer time is required to transmit vectors across the zone, such that by the time transmit vectors are fired which are immediately adjacent to previously fired vectors (e.g., 907–910 with respect to vectors 902–905) the distortion is given more time to decontaminate.

The number of vectors to fire non-sequentially varies based on the application and the confocal order. In one embodiment, the line spacing is 32 or 48 vectors.

By performing the non-sequential scanning, the present invention reduces axial interference, lateral interference and signal ring-down. Since an entire zone is scanned before scanning the next zone, the waves in each scan line are spaced apart from each other. By the time a sweep of a zone occurs from one side of the transducer to the other, the echos due to the transmit pulses at beginning of the sweep have diminished sufficiently, such that each line in the next zone may be scanned without interference from the previous transmit pulse on the line. Thus, the present invention effectively eliminates any needed guard time. Furthermore, the elimination of the guard time results in a substantial increase in frame rate. Therefore, the time required to scan an entire zone is long enough to efficiently eliminate axial interference. Hence, axial artifacts are reduced. In the present invention, since the vectors for a particular zone are spaced apart, lateral interference that may occur between adjacent vectors during the scanning of an entire zone is reduced. By reducing the lateral interference, the lateral artifacts are reduced and, thus, improves the image quality.

Moreover, the non-sequential firing of vectors within a zone also reduces signal ring-down. Signal ring-down is an extreme case of lateral interface. To prevent the signal ring-down from interfering with any vector fired in the vicinity, the present invention uses a line spacing of 32, 48, etc. (i.e., or an $$\left\lfloor \frac{n}{s} \right\rfloor$$

of 6, 4, etc.). By having the spacing of transmit vectors closer together, more vectors may be fired before having to send another transmit vector in the vicinity of any vector which is undergoing distortion. However, it should be noted that since the spacing between vectors may be reduced, lateral interference may increase. Therefore, any signal ring-down solutions must be balanced against its effects on lateral resolution.

Line Density Per Zone

The present invention also reduces the number of lines fired for each focal depth (i.e., the vector density). By varying the vector density, the present invention is able to obtain a higher quality lateral resolution and frame rate depending on the requirements of the user. In the present invention, the object may be imaged using either half-line, full-line or double density half-line scanning. Any type of scanning may be used in the present invention, such as 1/x or 2/x where x is the number of vectors fired per element and may be 1,2,3, . . . , n-1.

The vector density is varied per focal depth and per region of the transducer array. In the present invention, the transducer array is divided into multiple regions. For instance, a transducer may be divided into three lateral segments (e.g., left side, center and right side). For each of the lateral segments and for each zone, the specific number of vectors, or lines, to be transmitted may be designated. The vector density may be specified for each lateral segment of the array in each depth. The present invention may use either half-line, full-line or double half-line scanning in each region.

The specific vector density desired for the depth is defined by the desired spatial resolution. For instance, if high resolution is required in the center of the near field, half-line scanning will be used in the center of the transducer array in the first few zones while full-line scanning is used for the remaining zones. On the other hand, if a better resolution is desired in the far field, then full-line scanning can be used in the near field with half-line scanning used in the far field. Furthermore, if better resolution is required for a particular side or sides of the image, then half-line scanning may be employed in those regions while the remaining region are scanned with full-line scanning.

Examples of scan patterns for each lateral segment of the transducer array and each region are shown in FIGS. 10–13. In the examples depicted, four zones are shown designated 1–4. The arrow depicts the scanning direction. Note that although the scanning direction is shown as being either from top-down or from bottom-up, and the transducer is always at the top of the field of view in FIGS. 10–13. In other words, in FIGS. 10 and 11, the scanning direction is from top to bottom of the field of view while in FIGS. 12 and 13 scanning is from bottom to top, even though the transducer is always at the top of the field of view.

FIG. 10 shows the field of view in which four zones 1–4 are divided into seven regions. The scanning in zones 1 and 2 is the same. In zones 1 and 2, full-line (F.L.) scanning is performed at the edges (regions 1 and 7) and half-line (H.L.) scanning is performed in the center (i.e., regions 2–6). However, in zone 3, half-line scanning is performed in regions 3–5, while full-line scanning is performed in regions 1, 2, 6 and 7. Finally, in zone 4, half-line scanning is only performed in region 4, while the remaining regions are full-line scanned. The scan pattern in FIG. 10 results in increased resolution in the near field.

FIG. 11 shows another scan pattern for the four zones and seven regions. In zones 1 and 2, half-line (H.L.) scanning is performed at the edges (regions 1 and 7) and full-line (F.L.) scanning is performed in the center (i.e., regions 2–6). However, in zone 3, full-line scanning is performed in regions 3–5, while half-line scanning is performed in regions 1,2, 6 and 7. In zone 4, full-line scanning is only performed in region 4, while the remaining regions are half-line scanned. The scan pattern in FIG. 11 increase resolution in the edges of the far field.

FIG. 12 shows the field of view in which zones 3 and 4 are scanned the same. In zones 3 and 4, full-line scanning is performed at the edges (regions 1 and 7, while half-line scanning is performed in the center (i.e., regions 2–6). In zone 2, regions 1, 2, 6 and 7) are full-line scanned, while only regions 3–5 undergo half-line scanning. In region 1, all but the center region 3 are full-line scanned, while region 3 is half-line scanned. In this manner, the edge regions of the near field have increased resolution.

FIG. 13 shows the field of view in which zones 3 and 4 are scanned the same. In zones 3 and 4, half-line scanning is performed at the edges (regions 1 and 7), while full-line scanning is performed in the center (i.e., regions 2–6). In zone 2, regions 1, 2, 6 and 7) are half-line scanned, while only regions 3-5 undergo full-line scanning. In region 1, all but the center region 3 are half-line scanned, while region 3 is full-line scanned. In this manner, the center of the far field has increased resolution.

In one embodiment, the vectors that are half-line scanned for each focal depth are determined according to predetermined equations. If the focal depth is the first region at the base of the arrow, then the number of vectors that are half scanned for each focal depth are determined according to the equation $$\frac{(F_{max} - 1)}{F_{max}} * V_{max}$$

Else $$\frac{(F_{max} - F_{current})}{F_{max}} * V_{max}$$

where $F_{max}$ is the maximum number of focus regions, $F_{current}$ is the current focus region of interest and $V_{max}$ is the maximum number of vectors based on the transducer geometry. For example, if the maximum number of vectors for a probe is 96 and are above in the examples depicted in FIGS. 10-13, region 1 and 2 have 72 vectors, region 3 has 48 vectors, and region 4 has 24 vectors, that are half scanned.

Even though the design spatial resolution may be chosen, the present invention allows a clinically usable frame rate to be maintained. In one embodiment, the present invention maintains the frame rate in view of the desired spatial resolution according to the flow charts in FIGS. 14 and 15. In FIG. 14, an algorithm is defined wherein after the regions have been designated for full or half-line scanning, the designations are changed if the frame rate is not acceptable. Each region is checked starting with those regions in the zone closest to the beginning of the scan direction until the frame rate is acceptable. FIG. 15 allows the designation to be changed even though the frame rate is acceptable so that the frame rate may be improved. If the frame rate is acceptable, then each region is checked starting from the beginning of the scan direction. If the region has full-line vectors, a change is made to have the region undergo half-line scanning. Regions are changed until the frame rate is no longer acceptable (i.e., as high as possible in view of the limitations of the imaging system). The algorithms of FIGS. 14 and 15 are implemented in software and run by the processor of the system.

Specifically, with respect to FIG. 14, the vector densities are selected for each region of each zone (processing block 1401 ). This selection can be accomplished using the equations above. Next, the current zone is set to the zone that is closest to the beginning of the scanning direction (processing block 1402). Then, the first region in the current zone is set to the current region (processing block 1403).

A determination is then made as to whether the frame rate is acceptable (processing block 1404). If the frame rate is acceptable, then processing ends. However, if the frame rate is not acceptable, processing continues at processing block 1405 where a determination is made as to whether the current region has half-line vectors. If the current region does have half-line vectors, processing continues at processing block 1407 and the number of vectors in the current region are reduced by 2. After the number of vectors in the current region have been reduced in half, processing continues at processing block 1408.

However, if the current region does not have half-line vectors, processing continues at processing block 1406 where a determination is made as to whether the current region is the last region in the current zone. If the current region is not the last region in the current zone, the next region in the zone is set to the current region (processing block 1408) and processing continues at processing block 1404 where again the determination is made as to whether the frame rate is acceptable.

If the current region is the last region in the current zone, then processing continues at processing block 1409 where a determination is made as to whether the current zone is the last zone in the image. If the current zone is the last zone in the image, processing ends. This will imply that an acceptable frame rate could not be reached after modifying the designations of all of the regions in the entire image to be full-line scanned. In this case, the number of zones may have to be reduced or the scanning may have to be changed to double line scanning (or some other form of line scanning that results in an increase in frame rate) if available with the probe.

On the other hand, if the current zone is not the last zone in the field of view, then the next zone farther from the beginning of the scanning direction is set to the current zone (processing block 1410). Then, the first region of that current zone is set to the current region (processing block 1411 ), and processing continues at processing block 1404 where again a determination is made as to whether the frame rate is acceptable. When an acceptable frame rate has been reached, processing ends.

Specifically, with respect to FIG. 15, the vector densities are selected for each region of each zone (processing block 1501 ). This selection can be accomplished using the equations above. Next, the current zone is set to the zone that is closest to the beginning of the scanning direction (processing block 1502). Then, the first region in the current zone is set to the current region (processing block 1503).

A determination is then made as to whether the frame rate is acceptable (processing block 1504). If the frame rate is not acceptable, then processing ends. However, if the frame rate is acceptable, processing continues at processing block 1505 where a determination is made as to whether the current region has half-line vectors. If the current region does have half-line vectors, processing continues at processing block 1507 and the number of vectors in the current region are reduced by 2. After the number of vectors in the current region have been reduced in half, processing continues at processing block 1508.

However, if the current region does not have half-line vectors, processing continues at processing block 1506 where a determination is made as to whether the current region is the last region in the current zone. If the current region is not the last region in the current zone, the next region in the zone is set to the current region (processing block 1508) and processing continues at processing block 1504 where again the determination is made as to whether the frame rate is acceptable.

If the current region is the last region in the current zone, then processing continues at processing block 1509 where a determination is made as to whether the current zone is the last zone in the image. If the current zone is the last zone in the image, processing ends. This will imply that an acceptable frame rate could not be reached after modifying the designations of all of the regions in the entire image to be half-line scanned. In this case, the number of zones may have to be increased.

On the other hand, if the current zone is not the last zone in the field of view, then the next zone farther from the beginning of the scanning direction is set to the current zone (processing block 1510). Then, the first region of that current zone is set to the current region (processing block 1511), and processing continues at processing block 1504 where again a determination is made as to whether the frame rate is acceptable. When an acceptable frame rate has been reached, processing ends.

By using the present invention, the resulting images can be a totally half-line scanned image, a weighted half-line/full-line image of being the above equation or a totally full-line scanned image. Thus, portions of an object may be scanned at one resolution, while other portions are scanned at another resolution. By using the present invention, the lateral resolution can be increased where it is clinically beneficial while maintaining a useful frame rate.

Whereas many alterations and modifications of the present invention will no doubt become apparent to a person of ordinary skill in the art after having read the foregoing description, it is to be understood that the particular embodiment shown and described by illustration are in no way intended to be considered limiting. Therefore, reference to the details of the preferred embodiments are not intended to limit the scope of the claims which themselves recite only those features regarded as essential to the invention.

Thus, a method and means for continuously focusing the ultrasonic waves during transmit and receive has been described.

APPENDIX A

Example Tables For Depicting Confocal Orders of A–D
The CLA/3.5MI/40's ID is 4
Software version 1.40

|  | Off | A | B | C | D |
|---|---|---|---|---|---|
| RENAL/KIDNEY | | | | | |
| Field of View | 160 | | | | |
| Sector Size | 62 | | | | |
| Table (PID) | 1 | 2 | 4 | 5 | 7 |
| Foc Start (mm) | 42 | 42 | 42 | 42 | 42 |
| Number of Zones | 1 | 3 | 4 | 3 | 7 |
| Fire First | ZONE | ZONE | ZONE | ZONE | ZONE |
| Vector Dir | LFT/RHT | LFT/RHT | LFT/RHT | LFT/RHT | LFT/RHT |
| Zone Dir | TOP/BOT | TOP/BOT | TOP/BOT | TOP/BOT | TOP/BOT |
| Vec Spacing | 1 | 1 | 1 | 1 | 1 |
| Zone Spacing | 1 | 1 | 1 | 1 | 1 |
| H. L. Type | MICRO | MICRO | MICRO | MICRO | MICRO |
| Half Line F.R. | 40 | 30 | 26 | 10 | 10 |
| Power Max | 103 | 23 | 70 | 63 | 60 |
| Power Default | 30 | 30 | 30 | 30 | 30 |
| Confocal Status | OFF | BDC | BDC | BDC | BDC |
| LIVER | | | | | |
| Field of view | 160 | | | | |
| Sector Size | 62 | | | | |
| Table (PID) | 1 | 2 | 4 | 5 | 7 |
| Foc Start (mm) | 36 | 36 | 36 | 36 | 36 |
| Number of Zones | 1 | 3 | 4 | 5 | 7 |
| Fire First | ZONE | ZONE | ZONE | ZONE | ZONE |
| Vector Dir | LFT/RHT | LFT/RHT | LFT/RHT | LFT/RHT | LFT/RHT |
| Zone Dir | TOP/BOT | TOP/BOT | TOP/BOT | TOP/BOT | TOP/BOT |
| Vec Spacing | 1 | 1 | 1 | 1 | 1 |
| Zone Spacing | 1 | 1 | 1 | 1 | 1 |
| H. L. Type | MICRO | MICRO | MICRO | MICRO | MICRO |
| Half Line F.R. | 40 | 30 | 26 | 10 | 10 |
| Power Max | 103 | 93 | 70 | 63 | 60 |
| Power Default | 30 | 30 | 30 | 30 | 30 |
| Confocal status | OFF | BDC | BDC | BDC | BDC |
| OR | | | | | |
| Field of View | 150 | | | | |
| Sector Size | 62 | | | | |
| Table (PID) | 1 | 2 | 2 | 2 | 4 |
| Foc Start (mm) | 29 | 29 | 20 | 28 | 28 |
| Number of Zones | 1 | 2 | 3 | 3 | 4 |
| Fire First | ZONE | ZONE | ZONE | ZONE | ZONE |
| Vector Dir | LFT/RHT | LFT/RHT | LFT/RHT | LFT/RHT | LFT/RHT |
| Zone Dir | TOP/BOT | TOP/BOT | TOP/BOT | TOP/BOT | TOP/BOT |
| Vec Spacing | 1 | 1 | 1 | 1 | 1 |
| Zone Spacing | 1 | 1 | 1 | 1 | 1 |
| H.L. Type | MICRO | MICRO | MICRO | MICRO | MICRO |
| Half Line | 40 | 30 | 30 | 11 | 10 |
| Power Max | 103 | 93 | 93 | 93 | 70 |
| Power Default | 30 | 30 | 30 | 30 | 30 |
| Confocal Status | OFF | BDC | BDC | BDC | BDC |
| PELVIC | | | | | |
| Field of View | 150 | | | | |
| Sector size | 62 | | | | |
| Table (PID) | 1 | 2 | 2 | 2 | 4 |
| Foc Start (mm) | 29 | 28 | 28 | 28 | 28 |
| Number of Zones | 1 | 2 | 3 | 3 | 4 |

APPENDIX A-continued

| | | | | | |
|---|---|---|---|---|---|
| Fire First | ZONE | ZONE | ZONE | ZONE | ZONE |
| Vector Dir | LFT/RHT | LFT/RHT | LFT/RHT | LFT/RHT | LFT/RHT |
| Zone Dir | TOP/BOT | TOP/BOT | TOP/BOT | TOP/BOT | TOP/BOT |
| Vec spacing | 1 | 1 | 1 | 1 | 1 |
| Zone Spacing | 1 | 1 | 1 | 1 | 1 |
| H.L. Type | MICRO | MICRO | MICRO | MICRO | MICRO |
| Half Line F.R. | 40 | 30 | 30 | 15 | 15 |
| Power Max | 103 | 93 | 93 | 93 | 70 |
| Power Default | 30 | 30 | 30 | 30 | 30 |
| Confocal Status | OFF | BDC | BDC | BDC | BDC |

FETAL ECHO

| | | | | | |
|---|---|---|---|---|---|
| Field of view | 150 | | | | |
| Sector Size | 62 | | | | |
| Table (PID) | 1 | 2 | 2 | 2 | 4 |
| Foc Start (mm) | 28 | 28 | 28 | 28 | 28 |
| Number of Zones | 1 | 2 | 3 | 3 | 4 |
| Fire First | ZONE | ZONE | ZONE | ZONE | ZONE |
| Vector Dir | LFT/RHT | LFT/RHT | LFT/RHT | LFT/RHT | LFT/RHT |
| Zone Dir | TOP/BOT | TOP/BOT | TOP/BOT | TOP/BOT | TOP/BOT |
| Vec Spacing | 1 | 1 | 1 | 1 | 1 |
| Zone Spacing | 1 | 1 | 1 | 1 | 1 |
| H.L. Type | MRCRO | MICRO | MICRO | MICRO | MICRO |
| Half Line F.R. | 40 | 30 | 30 | 11 | 10 |
| Power Max | 103 | 93 | 93 | 93 | 70 |
| Power Default | 30 | 30 | 30 | 30 | 30 |
| Confocal status | OFF | BDC | BDC | BDC | BDC |

| | | Easy | | Moderate | | Difficult | |
|---|---|---|---|---|---|---|---|
| | Off | A | B | A | B | A | B |
| RENAL/KIDNEY | | | | | | | |
| Field of View | 160 | | | | | | |
| Sector size | 62 | | | | | | |
| Table (PID) | 0 | 3 | 7 | 4 | 6 | 10 | 10 |
| Foc Start (mm) | 36 | 23 | 15 | 23 | 3 | 42 | 42 |
| Focus Stop (mm) | 80 | 124 | 95 | 124 | 92 | 160 | 160 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/DOT | TOP/BOT | TOP/BOT | TOP/BOT | TOP/BOT |
| Vec Spacing | 2 | 2 | 2 | 2 | 2 | 2 | 2 |
| Zone spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 15 | 10 | 15 | 10 | 15 | 9 |
| Power Max | 103 | 103 | 60 | 70 | 63 | 58 | 58 |
| Power Default | 30 | 30 | 30 | 30 | 30 | 30 | 30 |
| Confocal Status | OFF | BC | BC | BC | BC | BC | BC |
| LIVER | | | | | | | |
| Field of view | 160 | | | | | | |
| Sector Size | 62 | | | | | | |
| Table (PID) | 0 | 3 | 7 | 4 | 6 | 10 | 10 |
| Foc Start (mm) | 36 | 23 | 15 | 23 | 3 | 42 | 42 |
| Focus Stop (mm) | 80 | 124 | 95 | 124 | 92 | 160 | 160 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 2 | 2 | 2 | 2 | 2 | 2 | 2 |
| Zone Spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 15 | 10 | 15 | 10 | 15 | 9 |
| Power Max | 103 | 103 | 60 | 70 | 63 | 58 | 58 |
| Power Default | 30 | 30 | 30 | 30 | 30 | 30 | 30 |
| Confocal Status | OFF | BC | BC | BC | BC | BC | BC |
| OB | | | | | | | |
| Field of View | 150 | | | | | | |
| Sector Size | 62 | | | | | | |
| Talbe (PID) | 0 | 3 | 8 | 4 | 4 | 10 | 10 |
| Foc Start (mm) | 28 | 23 | 16 | 23 | 23 | 62 | 62 |
| Focus Stop (mm) | 60 | 92 | 92 | 92 | 124 | 160 | 160 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 4 | 4 | 4 | 4 | 4 | 4 | 4 |
| Zone Spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 17 | 12 | 18 | 11 | 25 | 13 |
| Power Max | 103 | 103 | 103 | 70 | 70 | 58 | 58 |
| Power Default | 30 | 30 | 30 | 30 | 30 | 30 | 30 |
| Confocal Status | OFF | BC | BC | BC | BC | BC | BC |
| PELVIC | | | | | | | |
| Field of View | 150 | | | | | | |
| Sector Size | 62 | | | | | | |
| Table (PID) | 0 | 3 | 7 | 4 | 6 | 10 | 10 |

APPENDIX A-continued

| | | | | | | | |
|---|---|---|---|---|---|---|---|
| Foc Start (mm) | 36 | 23 | 15 | 23 | 3 | 42 | 42 |
| Focus Stop (mm) | 80 | 124 | 95 | 124 | 92 | 160 | 160 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 4 | 4 | 4 | 4 | 4 | 4 | 4 |
| Zone Spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 15 | 10 | 15 | 10 | 15 | 9 |
| Power Max | 103 | 103 | 60 | 70 | 63 | 58 | 58 |
| Power Default | 30 | 30 | 30 | 30 | 30 | 30 | 30 |
| Confocal Status | OFF | BC | BC | BC | BC | BC | BC |
| FETAL ECHO | | | | | | | |
| Field of View | 150 | | | | | | |
| Sector size | 62 | | | | | | |
| Table (PID) | 0 | 3 | 8 | 2 | 4 | 10 | 10 |
| Foc Start (mm) | 28 | 23 | 16 | 57 | 42 | 62 | 62 |
| Focus Stop (mm) | 60 | 92 | 92 | 124 | 124 | 124 | 160 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 4 | 4 | 4 | 4 | 4 | 4 | 4 |
| Zone Spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 27 | 20 | 29 | 20 | 28 | 18 |
| Power Max | 103 | 103 | 103 | 93 | 70 | 58 | 58 |
| Power Default | 30 | 30 | 30 | 30 | 30 | 30 | 30 |
| Confocal Status | OFF | BC | BC | BC | BC | BC | BC |

Examples Of Tables For Confocal Orders A and B With Sub-Categories Of Easy, Moderate, Difficult
The LA/10MI/40's ID is 16
Software version 1.59

| | | Easy | | Moderate | | Difficult | |
|---|---|---|---|---|---|---|---|
| | Off | A | B | A | B | A | B |
| NEONATAL | | | | | | | |
| Field of view | 70 | | | | | | |
| Sector Size | 0 | | | | | | |
| Table (PID) | 0 | 13 | 12 | 6 | 8 | 5 | 7 |
| Focus Start (mm) | 1 | 3 | 3 | 9 | 7 | 3 | 3 |
| Focus Stop (mm) | 20 | 22 | 26 | 46 | 46 | 46 | 46 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 2 | 2 | 2 | 2 | 2 | 2 | 2 |
| Zone Spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 13 | 7 | 15 | 7 | 17 | 10 |
| Power Max | 78 | 103 | 103 | 66 | 60 | 49 | 44 |
| Power Default | 42 | 42 | 42 | 42 | 42 | 42 | 44 |
| Confocal Status | OFF | BC | BC | BC | BC | BC | BC |
| SMALL PARTS | | | | | | | |
| Field of View | 50 | | | | | | |
| Sector Size | 0 | | | | | | |
| Table (PID) | 0 | 13 | 12 | 6 | 8 | 5 | 7 |
| Foc start (mm) | 1 | 3 | 3 | 9 | 7 | 3 | 3 |
| Focus Stop (mm) | 20 | 22 | 26 | 46 | 46 | 46 | 46 |
| Fire First | VECTOR | VBCTOR | VECTOR | VLCTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 2 | 2 | 2 | 2 | 2 | 2 | 2 |
| Zone Spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 13 | 7 | 15 | 7 | 17 | 10 |
| Power Max | 70 | 103 | 103 | 66 | 60 | 49 | 44 |
| Power Default | 42 | 42 | 42 | 42 | 42 | 42 | 44 |
| Confocal status | OFF | BC | BC | BC | BC | BC | BC |
| RENAL/KIDNEY | | | | | | | |
| Field of view | 50 | | | | | | |
| Sector Size | 0 | | | | | | |
| Table (PID) | 0 | 13 | 12 | 6 | 8 | 5 | 7 |
| FOC start (nm) | 1 | 3 | 3 | 9 | 7 | 3 | 3 |
| Focus Stop (mm) | 20 | 22 | 26 | 46 | 46 | 46 | 46 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 2 | 2 | 2 | 2 | 2 | 2 | 2 |
| Zone Spacing | 1 | 1 | 1 | 1 | 1 | 1 | 1 |
| H.L. TYpe | MICRO | MICRO | MICRO | MICRO | MICRO | MICRO | MICRO |
| Reg. Frame Rate | 100 | 13 | 7 | 15 | 7 | 17 | 10 |
| Power Max | 76 | 103 | 103 | 66 | 60 | 49 | 44 |
| Power Default | 42 | 42 | 42 | 42 | 42 | 42 | 44 |

APPENDIX A-continued

| | | | | | | | |
|---|---|---|---|---|---|---|---|
| Confocal status | OFF | BC | BC | BC | BC | BC | BC |
| LIVER | | | | | | | |
| Field of View | 50 | | | | | | |
| Sector size | 0 | | | | | | |
| Table (PID) | 0 | 13 | 12 | 6 | 8 | 5 | 7 |
| Foc Start (mm) | 1 | 3 | 3 | 9 | 7 | 3 | 3 |
| Focus Stop (mm) | 20 | 22 | 26 | 46 | 46 | 46 | 46 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 2 | 2 | 2 | 2 | 2 | 2 | 2 |
| Zone Spacing | 1 | 1 | 1 | 1 | 1 | 1 | 1 |
| R.L. Type | MICRO | MICRO | MICRO | MICRO | MICRO | MICRO | MICRO |
| Req. Frame Rate | 100 | 13 | 7 | 15 | 7 | 17 | 10 |
| Power Max | 78 | 103 | 103 | 66 | 60 | 49 | 44 |
| Power Default | 42 | 42 | 42 | 42 | 42 | 42 | 44 |
| Confocal Status | OFF | BC | BC | BC | BC | BC | BC |
| OB | | | | | | | |
| Field of View | 60 | | | | | | |
| Sector Size | 0 | | | | | | |
| Table (PID) | 0 | 13 | 12 | 6 | 8 | 5 | 7 |
| Foc Start (mm) | 25 | 3 | 3 | 3 | 3 | 19 | 18 |
| Focus stop (mm) | 60 | 22 | 26 | 36 | 36 | 70 | 70 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 2 | 2 | 2 | 2 | 2 | 2 | 2 |
| Zone Spacing | 1 | 2 | 1 | 1 | 1 | 1 | 1 |
| H.L. Type | MICRO | MICRO | MICRO | MICRO | MICRO | MICRO | MICRO |
| Req. Frame Rate | 100 | 26 | 14 | 28 | 17 | 25 | 15 |
| Power Max | 78 | 103 | 103 | 66 | 60 | 49 | 44 |
| Power Default | 42 | 42 | 42 | 42 | 42 | 42 | 44 |
| Confocal Status | OFF | BC | BC | BC | BC | BC | BC |
| VENOUS | | | | | | | |
| Field of View | 50 | | | | | | |
| Sector size | 0 | | | | | | |
| Table (PID) | 0 | 13 | 12 | 6 | 8 | 5 | 7 |
| Foc Start (mm) | 25 | 3 | 3 | 3 | 3 | 19 | 18 |
| Focus Stop (mm) | 60 | 22 | 26 | 36 | 36 | 70 | 70 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec spacing | 2 | 2 | 2 | 2 | 2 | 2 | 2 |
| Zone Spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 26 | 14 | 28 | 17 | 25 | 15 |
| Power Max | 78 | 103 | 103 | 66 | 60 | 49 | 44 |
| Power Default | 42 | 42 | 42 | 42 | 42 | 42 | 44 |
| Confocal Status | OFF | BC | BC | BC | BC | BC | BC |
| ARTERIAL | | | | | | | |
| Field of View | 50 | | | | | | |
| Sector Size | 0 | | | | | | |
| Table (PID) | 0 | 13 | 12 | 6 | 8 | 5 | 7 |
| Foc Start (mm) | 25 | 3 | 3 | 3 | 3 | 19 | 15 |
| Focus Stop (mm) | 60 | 22 | 26 | 36 | 36 | 70 | 70 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec spacing | 2 | 2 | 2 | 2 | 2 | 2 | 2 |
| Zone Spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 26 | 14 | 26 | 17 | 25 | 15 |
| Power Max | 79 | 103 | 103 | 66 | 60 | 49 | 44 |
| Power Default | 42 | 42 | 42 | 42 | 42 | 42 | 44 |
| Confocal Status | OFF | BC | BC | BC | BC | BC | BC |
| VASCULAR | | | | | | | |
| Field of View | 50 | | | | | | |
| Sector Size | 0 | | | | | | |
| Table (FID) | 0 | 13 | 12 | 6 | 8 | 5 | 7 |
| Foc Start (mm) | 25 | 3 | 3 | 3 | 3 | 19 | 18 |
| Focus Stop (mm) | 60 | 22 | 26 | 36 | 36 | 70 | 70 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 2 | 2 | 2 | 2 | 2 | 2 | 2 |
| Zone Spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 26 | 14 | 28 | 17 | 25 | 15 |
| Power Max | 78 | 103 | 103 | 66 | 60 | 49 | 44 |
| Power Default | 42 | 42 | 42 | 42 | 42 | 42 | 44 |
| Confocal Status | OFF | BC | BC | BC | BC | BC | BC |

APPENDIX A-continued

PELVIC

| Field of View | 60 | | | | | | |
|---|---|---|---|---|---|---|---|
| Sector Size | 0 | | | | | | |
| Table (PID) | 0 | 13 | 12 | 6 | 8 | 5 | 7 |
| Foc Start (mm) | 1 | 3 | 3 | 9 | 7 | 3 | 3 |
| Focus Stop (mm) | 20 | 22 | 26 | 46 | 46 | 46 | 46 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec spacing | 2 | 2 | 2 | 2 | 2 | 2 | 2 |
| Zone Spacing | 1 | 1 | 1 | 1 | 1 | 1 | 1 |
| H.L. Type | MICRO | MICRO | MICRO | MICRO | MICRO | MICRO | MICRO |
| Req. Frame Rate | 100 | 13 | 7 | 15 | 7 | 17 | 10 |
| Power Max | 78 | 103 | 103 | 66 | 60 | 49 | 44 |
| Power Default | 42 | 42 | 42 | 42 | 42 | 42 | 44 |
| Confocal Status | OFF | BC | BC | BC | BC | BC | BC |

BREAST IMAGING

| Field of View | 50 | | | | | | |
|---|---|---|---|---|---|---|---|
| Sector Size | 0 | | | | | | |
| Table (PID) | 0 | 9 | 12 | 11 | 11 | 5 | 7 |
| Foc Start (mm) | 1 | 3 | 3 | 3 | 3 | 3 | 0 |
| Focus Stop (mm) | 20 | 24 | 23 | 24 | 27 | 36 | 40 |
| Fire First | VECTOR | VECTOR | VECTOR | VECTOR | VECTOR | VECTOR | VECTOR |
| Vector Dir | LFT/RHT | LFT/RHT | LFT/RHT | LFT/RHT | LFT/RHT | LFT/RHT | LFT/RHT |
| Zone Dir | TOP/BOT | TOP/BOT | TOP/BOT | TOP/BOT | TOP/BOT | TOP/BOT | TOP/BOT |
| Vec Spacing | 2 | 2 | 2 | 2 | 2 | 2 | 2 |
| Zone Spacing | 1 | 2 | 1 | 1 | 1 | 1 | 1 |
| H.L. Type | MICRO | MICRO | MICRO | MICRO | MICRO | MICRO | MICRO |
| Req. Frame Rate | 100 | 14 | 8 | 15 | 8 | 15 | 9 |
| Power Max | 78 | 103 | 103 | 103 | 103 | 49 | 44 |
| Power Default | 42 | 42 | 42 | 42 | 42 | 42 | 44 |
| Confocal Status | OFF | BC | BC | BC | BC | BC | BC |

APPENDIX B

```
    fscale = alpha*s0*s0;
    izone = 0;
    zone[izone] = zmin;
    zone[izone + 1] = zmin + minzs-1;
/* loop over zones */
    while((izone < nzones) && (zone[izone + 1] <= zmax)){
/* loop over zone bottom */
        per = 0;
        while((per < phi) && (zone[izone + 1] < (zmax + maxzs))){
/* calcuate test values for center of zone, freq and wavelength,
and number of elements */
            zone[izone + 1] += zstep;
            zmid = .5*(zone[izone] + zone[izone + 1]);
            freq = f0 - fscale*zmid;
            lambda = c / (freq * 1000.);
            temp = zmid / (f*pitch);
            nel = .5*temp.+ .5;
            if(nel < 1)nel = 1;
            if(nel > nchan/2){
                nel = nchan/2;
                realf = zmid / (2.*pitch*nel);
            } else {
                realf = f;
            }
/* calculate phase error on actual aperture */
            per = 0.;
            for(iel = 0; iel < nel; iel++){
                x = (iel + .5)*pitch;
                per += x*x*(1./zmid - 1./(float)zone[izone + 1]);
            }
            per = .5*per / (nel*lambda);
/* estimate phase error for constant f number */
            temp = (zone[izone + 1] - zmid)/(24.*realf*realf*lambda);
            if(ecalc == 1)per = temp;
        }
        apsize[izone] = 2*nel;
        zone [izone + 1] -= zstep;
/* fix zone sizes if out of bounds */
        zdiff = zone[izone + 1] - zone[izone];
        if(zdiff <]minzs)zone[izone + 1] = zone[izone] + minzs;
        if(zdiff > maxzs)zone[izone + 1] = zone[izone] + maxzs;
        izone++;
        zone[izone + 1] = zone[izone];
    }
/* print out results */
    printf("CONFOCAL TRANSMIT ZONES/n/n");
```

APPENDIX B-continued

```
    printf("transmit freq = %1.2f mHz/n",f0);
    printf("bandwidth (1 s.d.) = %1.2f MHz/n",s0);
    printf("f number = 41.2f/n",f);
    printf("phase error = %1.2f/n/n",phi);
    printf("zone min max apsize/n/n");
    for(i= 0; i < izone; i++ )}
    printf("%6d %6d %6d %6d/n",i,zone[i],zone[i + 1],apsize[i]);
}
```

APPENDIX C

Typical computer output
CONFOCAL TRANSMIT ZONES transmit freq = 7.50 MHz
bandwidth (1 s.d.) = 2.00 MHz
f number = 2.00
phase error = 0.15

| zone | min | max | apsize |
|---|---|---|---|
| 0 | 1 | 6 | 4 |
| 1 | 6 | 12 | 12 |
| 2 | 12 | 18 | 18 |
| 3 | 18 | 24 | 26 |
| 4 | 24 | 30 | 32 |
| 5 | 30 | 36 | 40 |
| 6 | 36 | 42 | 48 |
| 7 | 42 | 51 | 48 |
| 8 | 51 | 61 | 48 |
| 9 | 61 | 71 | 48 |
| 10 | 71 | 81 | 48 |

We claim:

1. A method of imaging an object using energy waves, said method comprising the steps of:

(i) selecting a plurality of focal depths within the object, wherein each of said plurality of focal depths corresponds to one of a plurality of zones, and further wherein each of said plurality of zones has a depth and a lateral length that is substantially perpendicular to the depth; and (ii) sending a plurality of energy waves to one of said plurality of zones as a plurality of scan lines transmitted one at a time across the lateral length of said one of the plurality of zones, wherein the energy waves are focused at said one of the plurality of focal depths within the object, such that the waves are reflected from discontinuities within the object to produce a plurality of echo signals, wherein said one of the plurality of zones, corresponding to said one of the plurality of focal depths, is scanned along the entire lateral length before focusing at focal depths other than said one of the plurality of focal depths;

(iii) receiving the plurality of echo signals;

(iv) performing steps (ii) and (iii) for each one of the plurality of zones; and (v) generating an image of the object in response to the plurality of echos signals.

2. The method defined in claim 1 wherein the plurality of zones are scanned in order from the zone closest to the transducer face to the zone farthest from the transducer face.

3. The method defined in claim 1 wherein the plurality of zones are scanned in order from the zone farthest to the transducer face to the zone closest from the transducer face.

4. The method defined in claim 1 wherein the plurality of zones are scanned out of order.

5. The method defined in claim 1 wherein the plurality of energy waves for said one of the plurality of zones are fired, such that each of the plurality of energy waves successively fired are spaced a predetermined distance apart along the lateral length as the plurality of energy waves are transmitted across the depth of said one of the plurality of zones.

6. The method defined in claim 5 wherein the plurality of energy waves for said one of the plurality of zones are fired, such that each of the plurality of energy waves successively fired are spaced a distance of one aperture apart along the lateral length as the plurality of energy waves are transmitted across the depth of said one of the plurality of zones.

7. The method defined in claim 1 wherein the plurality of energy waves fired in one of the plurality of zones are fired non-sequentially.

8. The method defined in claim 1 wherein each of the plurality of energy waves has a corresponding transmit frequency and a bandwidth, said step of sending the plurality of energy waves further comprising the steps of:

adjusting the transmit frequency of the plurality of energy waves for each of said plurality of zones, such that the energy is localized at the plurality of focal depths within said object;

adjusting the bandwidth of the plurality of energy waves for each of said plurality of zones, such that the energy is localized at the plurality of focal depths within said object; and determining time delays between transmission necessary to ensure that energy waves subsequently transmitted to said one of the plurality of focal depths do not interfere with the reception of reflected energy waves from focal depths other than said one of the plurality of focal depths.

9. The method defined in claim 1 wherein each of the plurality of energy waves has a corresponding transmit frequency, an intensity and a bandwidth, said step of sending the plurality of energy waves further comprising the steps of:

adjusting the transmit frequency of the plurality of energy waves for each of said plurality of zones, such that the energy is localized at the plurality of focal depths within said object;

adjusting the bandwidth of the plurality of energy waves for each of said plurality of zones, such that the energy is localized at the plurality of focal depths within said object;

determining time delays between transmission necessary to ensure that energy waves subsequently transmitted to said one of the plurality of focal depths do not interfere with the reception of reflected energy waves from focal depths other than said one of the plurality of focal depths; and increasing the intensity of said plurality of energy waves for the deeper of said plurality of zones.

10. The method defined in claim 1 wherein each of the plurality of energy waves has a corresponding transmit frequency, an intensity and a bandwidth, said step of sending the plurality of energy waves further comprising the steps of:

adjusting the transmit frequency of the plurality of energy waves for each of said plurality of zones, such that the energy is localized at the plurality of focal depths within said object;

adjusting the bandwidth of the plurality of energy waves for each of said plurality of zones, such that the energy is localized at the plurality of focal depths within said object;

determining time delays between transmission necessary to ensure that energy waves subsequently transmitted to said one of the plurality of focal depths do not interfere with the reception of reflected energy waves from focal depths other than said one of the plurality of focal depths;

increasing the intensity of said waves for the deeper of said plurality of zones; and maintaining constant and small phase errors at boundaries between each of said plurality of zones.

11. The method defined in claim 1 wherein each of the plurality of energy waves has a corresponding transmit frequency, an intensity and a bandwidth, said step of sending the plurality of energy waves further comprising the steps of:

adjusting the transmit frequency of the plurality of energy waves for each of said plurality of zones, such that the energy is localized at the plurality of focal depths within said object;

adjusting the bandwidth of the plurality of energy waves for each of said plurality of zones, such that the energy is localized at the plurality of focal depths within said object;

determining time delays between transmission necessary to ensure that energy waves subsequently transmitted to said one of the plurality of focal depths do not interfere with the reception of reflected energy waves from focal depths other than said one of the plurality of focal depths;

increasing the intensity of said plurality of energy waves for the deeper of said plurality of zones;

maintaining constant and small phase errors at boundaries between each of said plurality of zones; and maintaining a low and constant f-number.

12. A method of imaging an object using ultrasonic waves, said method comprising the steps of:

(i) selecting a plurality of focal depths within the object, wherein each of said plurality of focal depths corresponds to one of a plurality of zones, and further wherein each of said plurality of zones has a depth and a lateral length that is substantially perpendicular to the depth; and (ii) sending a plurality of ultrasonic waves to one of the plurality of zones as a plurality of scan lines transmitted one at a time across the lateral length of said one of the plurality of zones, wherein the ultrasonic waves are focused at said one of the plurality of focal depths within the object, such that the waves are reflected from discontinuities within the object to produce a plurality of echo signals, such that said one of the plurality of zones corresponding to said one of the plurality of focal depths is scanned along the entire lateral length before focusing at focal depths other than said one of the plurality of focal depths, and wherein the ultrasonic waves, successively fired for said one of the plurality of zones as each zone is scanned from one side of the lateral length to the other, are spaced a predetermined distance apart;

(iii) receiving the plurality of echo signals;

(iv) performing steps (ii) and (iii) for each one of the plurality of zones; and (v) generating an image of the object in response to the plurality of echos signals.

13. The method defined in claim 12 wherein the plurality of zones are scanned in order from the zone closest to the transducer face to the zone farthest from the transducer face.

14. The method defined in claim 12 wherein the plurality of zones are scanned in order from the zone farthest to the transducer face to the zone closest from the transducer face.

15. The method defined in claim 12 wherein the plurality of zones are scanned out of order.

16. The method defined in claim 12 wherein the plurality of ultrasonic waves for said one of the plurality of zones are fired, such that each of the plurality of ultrasonic waves successively fired are spaced a distance of one aperture apart along the lateral length as the plurality of ultrasonic waves are transmitted across the zone.

17. The method defined in claim 12 wherein the plurality of ultrasonic waves fired in said one of the plurality of zones are fired non-sequentially along the lateral length.

18. A method for scanning an object using energy waves and a transducer with a transducer face having a number of lateral segments, said method comprising the steps of:

selecting a plurality of focal depths within the object, such that a plurality of zones are chosen for imaging, wherein each of the lateral segments of the transducer face transmits energy waves to a distinct region of each of the zones; and sending a plurality of energy waves to each of the plurality of zones, wherein the energy waves are focused at each of the plurality of focal depths, such that the waves are reflected from discontinuities within the object to produce a plurality of echo signals, wherein the step of sending the plurality of energy waves includes varying the vector density for each of the plurality of regions in each of the plurality of zones based on a frame rate, such that the object is scanned.

19. The method defined in claim 18 wherein one of the plurality of zones includes full line scanning and half-line scanning.

20. The method defined in claim 18 wherein the transducer face is comprised of three lateral segments.

21. The method defined in claim 18 wherein one of the plurality of zones includes full-line scanning and double-line scanning.

22. The method defined in claim 18 wherein one of the plurality of zones is scanned using a first type of scanning and a second type of scanning, wherein the first type and the second type are not the same.

23. The method defined in claim 18 wherein half-line scanning is performed in regions in the plurality of zones to increase lateral resolution.

24. The method defined in claim 18 wherein the object is scanned in a direction, and wherein the vector density is reduced if the frame rate is below a predetermined rate.

25. The method defined in claim 18 wherein the object is scanned in a direction, and wherein the vector density is increased if the frame rate is above a predetermined rate.

26. A method for scanning an object using energy waves using a transducer with a transducer face having a number of later segments, said method comprising the steps of:

selecting a plurality of focal depths within the object, such that a plurality of zones are chosen for imaging, wherein each of the lateral segments transmits energy waves to a distinct region of each of the zones;

sending a plurality of energy waves to each of the plurality of zones, wherein the energy waves are focused at each of the plurality of focal depths, such that the waves are reflected from discontinuities within the object to produce a plurality of echo signals, and wherein the object is scanned in a direction, wherein the step of sending the plurality of energy waves includes varying the vector density for each of the plurality of regions in each of the plurality of zones, such that the object is scanned;

varying the vector density, wherein the vector density is reduced if the frame rate is below a predetermined rate and wherein the vector density is increased if the frame rate is above a predetermined rate.

27. An apparatus for generating an image of an object having discontinuities comprising:

transmitter means for transmitting a plurality of energy waves to each of a plurality of focal depths within the object, wherein the energy waves are successively fired from the transmitter means, such that the waves are reflected from discontinuities within the object to produce a plurality of echo signals, and further wherein each one of a plurality of zones has a depth and a lateral length that is substantially perpendicular to the depth and corresponding to each one of the plurality of focal depths and is scanned along the lateral length before scanning other zones, such that each of the plurality of zones at each of the plurality of depths are scanned completely one at a time; and receiver means for receiving the plurality of echo signals from each of the plurality of zones, wherein the receiving means generates the image according to the plurality of echo signals received.

28. The apparatus defined in claim 27 wherein the plurality of zones are scanned in order.

29. The apparatus defined in claim 28 wherein one of the plurality of zones is closest to the transmitter means, and wherein said one of the plurality is scanned first.

30. The apparatus defined in claim 29 wherein one of the plurality of zones is farthest from the transmitter means, and wherein said one of the plurality of zones is scanned first.

31. The apparatus defined in claim 29 wherein the plurality of zones are scanned out-of-order.

32. The apparatus defined in claim 27 wherein the plurality of energy waves for one of the plurality of zones are successively fired, such that the plurality of energy waves are spaced a predetermined distance apart as the plurality of energy waves are transmitted across said one of the plurality of zones.

33. The apparatus defined in claim 27 wherein the plurality of energy waves for one of the plurality of zones are successively fired, such that the plurality of energy waves are spaced one aperture apart as the plurality of energy waves are transmitted across said one of the plurality of zones.

34. The apparatus defined in claim 27 wherein the plurality of energy waves are fired non-sequentially in one of said plurality of zones.

35. An apparatus for generating an image of an object having discontinuities comprising:
  transmitter means for transmitting a plurality of ultrasound waves to each of a plurality of focal depths within the object, wherein each of the plurality of ultrasound waves for each of a plurality of focal depths is separated by a distance from other ultrasound waves as the plurality of ultrasound waves are fired from one side of the transducer to the other, such that the waves are reflected from discontinuities within the object to produce a plurality of echo signals, and further wherein the plurality of ultrasound waves are sent to each of the plurality of focal depths, such that each of the plurality of zones are scanned one at a time; and
  receiver means for receiving the plurality of echo signals from each of the plurality of zones, wherein the receiving means generates the image according to the plurality of echo signals received.

36. An apparatus for generating an image of an object having discontinuities comprising:
  a transducer, comprising a transducer face, to transmit a plurality of energy waves for each of a plurality of focal depths within the object, such that the waves are reflected from discontinuities within the object to produce a plurality of echo signals;
  a controller coupled to said transducer to control the transducer,
  wherein the transducer face comprises a predetermined number of lateral segments, wherein each of the predetermined number of lateral segments transmits energy waves, to a distinct region of each of the plurality of zones, and wherein the controller causes the energy waves to be transmitted by the transducer so that the energy waves have a vector density that varies for each of the plurality of regions in each of the plurality of zones is varied; and
  a receiver, coupled to the transducer to receive the plurality of echo signals from each of the plurality of zones, wherein the receiver generates the image according to the plurality of echo signals received.

37. The apparatus defined in claim 36 wherein the transducer scans each of the plurality of zones one at a time.

38. The apparatus defined in claim 36 wherein the transducer varies the vector density according to a desired frame rate.

39. The apparatus defined in claim 36 wherein the transducer half-line scans at least one region of one of the plurality of zones and the transducer full-line scans at least one region of another of the plurality of zones.

40. The apparatus defined in claim 36 wherein the transducer face comprises three lateral segments.

41. The apparatus defined in claim 36 wherein the transducer scans one of the plurality of zones using a plurality of types of scanning.

42. The apparatus defined in claim 36 wherein the transducer scans one of the plurality of zones using a first type of scanning and a second type of scanning, wherein the first and the second type of scanning are not the same.

* * * * *